United States Patent
Takeda et al.

(10) Patent No.: US 10,841,935 B2
(45) Date of Patent: Nov. 17, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/755,909

(22) PCT Filed: Aug. 23, 2016

(86) PCT No.: PCT/JP2016/074550
§ 371 (c)(1),
(2) Date: Feb. 27, 2018

(87) PCT Pub. No.: WO2017/038563
PCT Pub. Date: Mar. 9, 2017

(65) Prior Publication Data
US 2018/0332603 A1    Nov. 15, 2018

(30) Foreign Application Priority Data

Aug. 31, 2015    (JP) .................................. 2015-171450

(51) Int. Cl.
*H04W 72/12*    (2009.01)
*H04W 88/06*    (2009.01)
(Continued)

(52) U.S. Cl.
CPC ......... *H04W 72/1263* (2013.01); *H04J 11/00* (2013.01); *H04L 5/001* (2013.01);
(Continued)

(58) Field of Classification Search
CPC . H04W 72/1263; H04W 88/06; H04W 72/04; H04L 5/001; H04L 5/14; H04J 11/00
See application file for complete search history.

(56) References Cited

U.S. PATENT DOCUMENTS 9,167,446 B2   10/2015  Sikri et al.
9,414,316 B2   8/2016   Ishii
(Continued)

FOREIGN PATENT DOCUMENTS

JP    2012-004608 A    1/2012
JP    2014508468 A     4/2014
(Continued)

OTHER PUBLICATIONS

International Search Report of the International Searching Authority issued in PCT/JP2016/074550 dated Nov. 1, 2016 (2 pages).
(Continued)

*Primary Examiner* — Ajay Cattungal
(74) *Attorney, Agent, or Firm* — Osha Bergman Watanabe & Burton LLP

(57) ABSTRACT

In order to allow even a user terminal not supporting UL simultaneous communication to communicate appropriately in a future radio communication system, the present invention provides a user terminal communicating with a plurality of communication systems, having a reception section that receives a downlink (DL) signal transmitted from each of the communication system; a transmission section that transmits an uplink (UL) signal to each of the communication system; and a control section that controls reception of the DL signal and transmission of the UL signal. The control section controls not to transmit UL signals simultaneously to different communication systems.

13 Claims, 17 Drawing Sheets

(51) Int. Cl.
*H04J 11/00* (2006.01)
*H04W 72/04* (2009.01)
*H04L 5/00* (2006.01)
*H04L 5/14* (2006.01)

(52) U.S. Cl.
CPC ............... *H04L 5/14* (2013.01); *H04W 72/04* (2013.01); *H04W 88/06* (2013.01)

(56) References Cited

U.S. PATENT DOCUMENTS

| | | | |
|---|---|---|---|
| 9,432,147 B2* | 8/2016 | Park | H04L 1/1861 |
| 9,549,080 B2 | 1/2017 | Tabet et al. | |
| 9,853,795 B2* | 12/2017 | Park | H04L 1/1854 |
| 2013/0250772 A1 | 9/2013 | Yin | |
| 2014/0161002 A1 | 6/2014 | Gauvreau et al. | |
| 2014/0369242 A1* | 12/2014 | Ng | H04L 5/1469 370/280 |
| 2015/0146588 A1* | 5/2015 | Park | H04L 5/14 370/280 |
| 2015/0271837 A1* | 9/2015 | Larsson | H04B 7/2615 370/329 |
| 2016/0095087 A1* | 3/2016 | Mohseni | H04W 72/02 455/558 |
| 2016/0112178 A1 | 4/2016 | Yi et al. | |
| 2016/0227557 A1* | 8/2016 | Fanous | H04W 72/10 |
| 2016/0249338 A1* | 8/2016 | Hwang | H04L 5/1469 |

FOREIGN PATENT DOCUMENTS

| | | |
|---|---|---|
| JP | 2015514333 A | 5/2015 |
| JP | 2015-149723 A | 8/2015 |
| WO | 2014/113325 A1 | 7/2014 |
| WO | 2014209049 A1 | 12/2014 |
| WO | 2015088046 A1 | 6/2015 |
| WO | 2015116387 A1 | 8/2015 |
| WO | 2015126563 A1 | 8/2015 |

OTHER PUBLICATIONS

Written Opinion of the International Searching Authority issued in PCT/JP2016/074550 dated Nov. 1, 2016 (4 pages).
NTT DOCOMO; "Design of TDD-FDD Carrier Aggregation for LTE Rel. 12"; 3GPP TSG RAN WG1 Meeting #74bis, R1-134495; Guangzhou, China; Oct. 7-11, 2013 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16841595.8, dated Mar. 13, 2019 (9 pages).
Office Action issued in Japanese Application No. 2017-537772; dated Jun. 8, 2020 (6 pages).

* cited by examiner

FIG. 8A

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG. 8B

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6, 5 | 5, 4 | 4 | – | – | 6, 5 | 5, 4 | 4 |
| 1 | – | – | 7, 6 | 6, 5, 4 | – | – | – | 7, 6 | 6, 5, 4 | – |
| 2 | – | – | 8, 7, 6, 5, 4 | – | – | – | – | 8, 7, 6, 5, 4 | – | – |
| 3 | – | – | 11, 10, 9, 8, 7, 6 | 6, 5 | 5, 4 | – | – | – | – | – |
| 4 | – | – | 12, 11, 10, 9, 8, 7 | 7, 6, 5, 4 | – | – | – | – | – | – |
| 5 | – | – | 13, 12, 11, 10, 9, 8, 7, 6, 5, 4 | – | – | – | – | – | – | – |
| 6 | – | – | 8, 7 | 7, 6 | 6, 5 | – | – | 7 | 7, 6, 5 | – |

FIG. 9A

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

FIG. 9B

| DL-reference UL/DL Configuration | Maximum number of HARQ processes |
|---|---|
| 0 | 10 |
| 1 | 11 |
| 2 | 12 |
| 3 | 15 |
| 4 | 16 |
| 5 | 16 |
| 6 | 12 |

FIG. 9C

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

FIG. 11A

| UL/DL Configuration | Subframe (n + x) mod 10 | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | – | – | – | 6 | – | 4 |
| 1 | – | – | 7, 6 | 4 | 4 | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG. 11B

| UL/DL Configuration | Subframe (n + x) mod 10 | | | | | | | | | |
|---|---|---|---|---|---|---|---|---|---|---|
| | 0 | 1 | 2 | 3 | 4 | 5 | 6 | 7 | 8 | 9 |
| 0 | – | – | 6, 5 | 5, 4 | 4 | – | – | 6, 5 | 5, 4 | 4 |
| 1 | – | – | 7, 6 | 6, 5, 4 | – | – | – | 7, 6 | 6, 5, 4 | – |
| 2 | – | – | 8, 7, 6, 5, 4 | – | – | – | – | 8, 7, 6, 5, 4 | – | – |
| 3 | – | – | 11, 10, 9, 8, 7, 6 | 6, 5 | 5, 4 | – | – | – | – | – |
| 4 | – | – | 12, 11, 10, 9, 8, 7 | 7, 6, 5, 4 | – | – | – | – | – | – |
| 5 | – | – | 13, 12, 11, 10, 9, 8, 7, 6, 5, 4 | – | – | – | – | – | – | – |
| 6 | – | – | 8, 7 | 7, 6 | 6, 5 | – | – | 7 | 7, 6, 5 | – |

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). For the purposes of achieving further broadbandization and higher speed beyond LTE, LTE Advanced (Rel. 10-12) has been standardized and further successor systems to LTE have been also studied (for example, such a system is known as 5G ($5^{th}$ Generation Mobile Communication System), FRA (Future Radio Access), etc.)

In LTE Rel. 10/11, in order to achieve broadbandization, carrier aggregation has been introduced by aggregating a plurality of component carriers (CCs). Each CC is one unit of LTE Rel. 8 system band. Besides, in CA, a plurality of CCs of one radio base station (eNB: eNodeB) are configured in a user terminal (UE: User Equipment).

In the meantime, in LTE Rel. 12, dual connectivity has been also introduced in which a user terminal is configured with a plurality of cell groups (CGs) of different radio base stations. Each cell group is formed of at least one cell (CC). In DC, a plurality of CCs of different radio base stations are aggregated and therefore, such DC is called Inter-eNB CA.

In LTE Rel. 8-12, there have been introduced a frequency division duplex (FDD) scheme and a time division duplex (TDD) scheme downlink (DL) transmission. The FDD scheme is such that downlink (DL) transmission and uplink (UL) transmission are performed using different frequency bands, while the TDD scheme is such that DL transmission and UP transmission are performed using different time domains.

In addition, in LTE Rel. 8-12, HARQ (Hybrid Automatic Repeat reQuest) has been used for retransmission control. HARQ is such that when receiving data, a user terminal (or a radio base station) feeds back a transmission acknowledgement signal (HARQ-ACK) about the data in accordance with a result of data reception and a radio base station (or a user terminal) controls retransmission of the data based on the HARQ-ACK received as feedback.

In the thus configured LTE Rel. 8-12, the transmission time interval (TTI) applied to DL transmission and UL transmission between the radio base station and the user terminal is controlled to be set to 1 ms. The TTI is also called a transmit time interval and TTI in the LTE system (Rel. 8-12) is also called subframe length.

CITATION LIST

Non Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In a future communication system (for example, 5G), there is a demand for further higher speed and larger capacity for mobile broadband applications, and there is also a demand for achieving reduction of delay and connection from many devices. In order to achieve further higher speed and greater capacity, use of a further broadband frequency spectrum is also expected. For example, in a future communication system, communication in a high frequency band of several tens GHz and communication of a relatively small amount data such as IoT (Internet of Things), MTC (machine Type Communication), M2M (Machine To Machine) are also expected to be performed.

In order to meet the above-mentioned demands, in a future communication system, a user terminal is expected to use a new communication system (New-RAT) that has been designed in consideration of MIMO (Massive MIMO) using high frequencies and many antenna elements. Further, in a future radio communication system, the new communication system (New-RAT) is also expected to operate in combination with an existing LTE system. For example, a user terminal may is considered to perform communication using the new communication system (for example, CA and/or DC, etc.) as well as the existing LTE system.

However, when a user terminal performs communications (for example, DC) using a plurality of communication systems, the user terminal may transmit UL signals simultaneously toward the plurality of base stations (for example, LTE base stations and New-RAT base stations). If the user terminal does not support UL simultaneous transmission for the plurality of systems (not capable of UL simultaneous transmission), there is a risk that the user terminal is not able to perform the communication appropriately.

The present invention was carried out in view of the foregoing and aims to provide a user terminal, a radio base station and a radio communication method capable of communications in a future radio communication system even when the UL simultaneous transmission is not supported.

Solution to Problem

The present invention provides a user terminal communicating with a plurality of communication systems, the user terminal comprising: a reception section that receives a downlink (DL) signal transmitted from each of the communication system; a transmission section that transmits an uplink (UL) signal to each of the communication system; and a control section that controls reception of the DL signal and transmission of the UL signal, wherein the control section controls not to transmit UL signals simultaneously to different communication systems.

Advantageous Effects of Invention

According to the present invention, it is possible to perform HARQ-ACK transmission appropriately in a future radio communication system.

BRIEF DESCRIPTION OF DRAWINGS

FIGS. 8A and 8B are diagrams illustrating an example of a table defining the transmission timing of UL signals in LTE-FDD cell according to the second embodiment;

FIGS. 9A to 9C are diagrams illustrating an example of a table defining the number of HARQ processes used in an LTE-FDD cell according to the second embodiment;

FIGS. 11A and 11B are diagrams illustrating another example of the table defining the transmission timing of a UL signal in an LTE-FDD cell according to the second embodiment;

DESCRIPTION OF EMBODIMENTS

Figure 1:
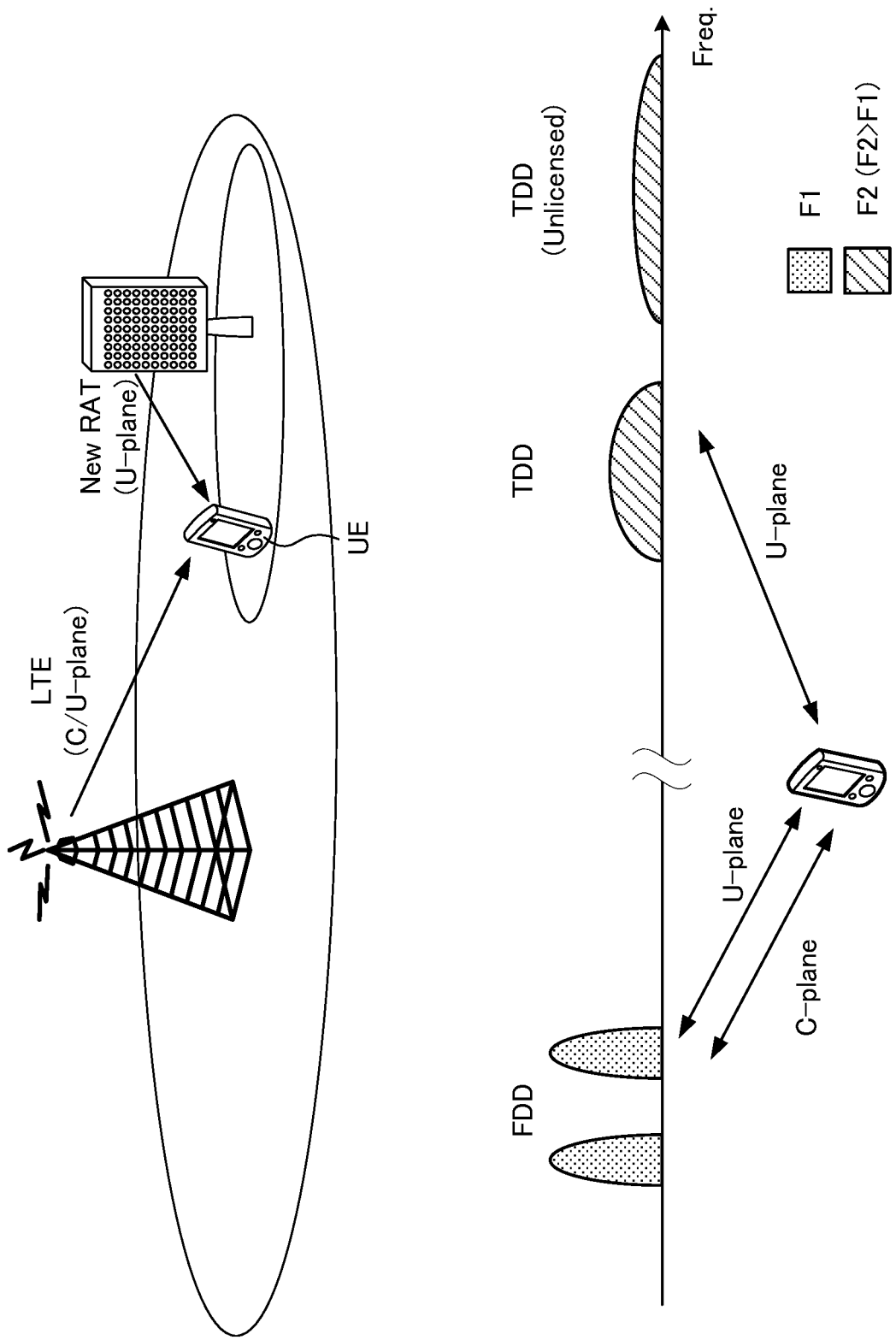
FIG. 1 is a diagram illustrating an example of operation of a future radio communication system.

FIG. 1 is a diagram illustrating an example of an operation mode of a future radio communication system (for example, 5G). In FIG. 1, it is assumed that a user terminal is connected to a new communication system and an existing (legacy) LTE/LTE-A system (hereinafter referred to as "LTE system"). The new communication system is also expected to be designed in consideration of MIMO (Massive MIMO) using high frequencies and many antenna elements. In addition, a cell of the new communication system is arranged to overlap a coverage of a cell of the LTE system. Here, the new communication system is also called New-RAT, 5G-RAT, new RAT, etc. (hereinafter referred to as "New-RAT").

New-RAT may be configured as a system extended from the LTE/LTE-A system. In addition, New-RAT may be a system applied with a radio frame configuration that is different from a radio frame configuration of the LTE system. For example, the radio frame configuration of New-RAT may be configured to be different from the radio frame configuration of the LTE system in at least one of the transmission time interval(TTI), symbol length, subcarrier interval and bandwidth.

As illustrated in FIG. 1, it may be configured that the LTE system is used to reserve the coverage and New-RAT is used to increase throughputs. In addition, the LTE system and New-RAT are combined to be applied with carrier aggregation (CA) and dual connectivity (DC). When the LTE system and New-RAT are combined with application of DC, it is possible to relax the requirements for backhaul connection between the LTE base station and the New-RAT base station and install the base stations flexibly and inexpensively, as compared with combination of the LTE system and New-RAT with application of CA.

When carrier aggregation (CA) applies, the communication between the user terminal and the radio base station is performed using a plurality of cells (or component carriers (CCs)). Further, in CA, one scheduler (for example, a scheduler having a macro baes station eNB) controls scheduling of a plurality of cells (for example, a small cell formed by a small base station). Thus, in the configuration where the scheduler of a macro base station controls scheduling of a plurality of cells, connection between the radio base stations is expected to be established by ideal backhaul like a high-speed line such as an optical fiber.

In addition, when CA applies, the user terminal controls to transmit uplink control information such as HARQ-ACKs for a plurality of cells by using an uplink control channel (PUCCH) of a given cell (for example, primary cell (PCell)).

When dual connectivity (DC) is applied, a plurality of schedulers are provided independently, and the plurality of schedulers (for example, a scheduler of radio base station MeNB and a scheduler of radio base station SeNB) each controls scheduling of one or more cells controlled by itself. In the configuration in which the scheduler of the radio base station MeNB and the scheduler of the radio base station SeNB control scheduling respectively, the base stations are expected to be connected by non-ideal backhaul with unignorable delay.

Therefore, in DC, it is assumed that dense coordinated control between eNBs like that in CA cannot be performed. Accordingly, downlink L1/L2 control (PDCCH/EPDCCH) and uplink L1/L2 control (UCI feedback by PUCCH/PUSCH) need to be performed by each eNB independently.

In addition, in DC, each radio base station configures a cell group (CG) formed of one or more cells. Each cell group is configured of one or more cells formed by one radio base station or of one or more cells formed by one transmission point such as a transmission antenna device, a transmission station or the like.

A cell group including PCell is called master cell group (MCG: Master CG) and a cell group other than the MCG is called secondary cell group (SCG: Secondary CG). In each cell group, CA of two or more cells is able to be performed. Further, a radio base station configured with MCG is called master base station (MeNB: Master eNB) and a radio base station configured with SCG is called secondary base station (SeNB: Secondary eNB).

DC is not premised on dense coordination between radio base stations equivalent to that in CA. Accordingly, the user terminal performs downlink L1/L2 control (PDCCH/EPD- CCH) and uplink L1/L2 control (UCI (Uplink Control Information) feedback by PUCCH/PUSCH) per cell group independently. In DC, even the secondary base station is provided with a cell (PSCell) having equivalent functions to PCell such as common search space and PUCCH configuration.

As stated above, when DC applies, it is difficult to perform coordination between base stations at the scheduler level. Further, in the LTE system (Rel. 12), a user terminal supporting DC is assumed to support UL simultaneous transmission in both frequencies. Accordingly, when the user terminal is connected the LTE base station and the New-RAT base station with application of DC like in Rel. 12, it is necessary to support simultaneous transmission of UL signals from the user terminal to the LTE base station and the New-RAT base station.

When the user terminal applies DC, the numbers of physical layer channels and signals as required become larger than those in the case of CA. For example, when CA applies, the user terminal is able to transmit uplink control information (UCI) for a plurality of cells by using an uplink control channel of the primary cell (PCell). On the other hand, when DC applies, the user terminal needs to transmit uplink control information by using an uplink control channel of a given cell (for example, PCell, PSCell) for each of a plurality of cell groups (MCG, SCG).

Accordingly, when the user terminal connects to the LTE base station and the New-RAT base station with application of DC, like in Rel. 12, it is necessary to support UL simultaneous transmission as well as to implement an RF circuit capable of reducing higher harmonic wave components and unnecessary radiation.

However, at the time of introduction of New-RAT, all the user terminals do not support UL simultaneous transmission for a plurality of communication systems using different frequencies. In such a case, a user terminal not capable of UL simultaneous transmission is not able to perform communication (for example, DC) using the LTE system and the New-RAT appropriately. In addition, even when the user terminal supports simultaneous reception of DL signals transmitted from a plurality of communication systems, the user terminal may not be able to perform communication using the LTE system and the New-RAT.

Then, the present inventors have found the idea of controlling the user terminal not to perform UL simultaneous transmission for a plurality of communication systems by controlling the timing of UL transmission of the user terminal for each of the communication system. Thus, by controlling the user terminal not to overlap UL transmissions for different communication systems with each other in the time domain, even a user terminal incapable of UL simultaneous transmission becomes able to perform communication using a plurality of communications systems (for example, DC) appropriately.

In addition, the present inventors have found that when controlling the user terminal not to perform UL simultaneous transmission for a plurality of communication systems, if the user terminal performs UL transmission by using the transmission timing of the existing LTE system in an FDD cell, the UL transmission occasions are restricted in other communication systems. On the other hand, the present inventors have found that in order to increase UL transmission occasions in other communication systems, when UL transmission is restricted in an FDD cell using the transmission timing of the existing LTE system, DL allocation in the FDD cell is also restricted.

Then, the present inventors have found the idea that when performing UL transmission in the FDD cell of a given system (for example, LTE system), transmission is performed by combining UL signals for a plurality of DL subframes (for example, ACK/NACKs) to a given UL subframe. For example, when performing UL transmission in the FDD cell, the user terminal controls the UL transmission by using scheduling and/or HARQ-ACK transmission timing defined in TDD (for example, transmission timing defined for each UL/DL configuration).

With this configuration, communication is allowed by reducing the restriction on DL allocation subframes of the LTE system (or LTE carrier, LTE CC, LTE cell) and the restriction on the UL transmission occasions of the New-RAT (or New-RAT carrier, New-RAT CC, New-RAT cell).

Then, the present embodiment will be described in detail below. In the following embodiment, it is assumed that the radio communication systems to which the user terminal connects are the LTE system and the New-RAT, but this is not intended to limit the present invention. The present invention is also applicable to the case where the user terminal connects to a plurality of New-RATs. Note that the New-RAT may be a system extended from the LTE/LTE-A system or a new system. For example, New-RAT may be a system that is different from the LTE system in at least one of the transmission time interval (TTI), symbol length, subcarrier interval and bandwidth.

Further, in the following description, it is assumed that the user terminal is connected to a plurality of communication systems by using DC, however, this is not intended to limit the present invention. Any communication mode may be applied as far as UL simultaneous transmission for different communication systems is supported. In addition, in the following description, a cell using FDD (FDD cell) is configured in the LTE system, but the cell may be a cell using TDD (TDD cell).

First Embodiment

In the first embodiment, it is assumed that in a user terminal that communicates with a plurality of communication systems with application of DC, control is made not to cause UL simultaneous transmissions between the communication systems.

Figure 2:
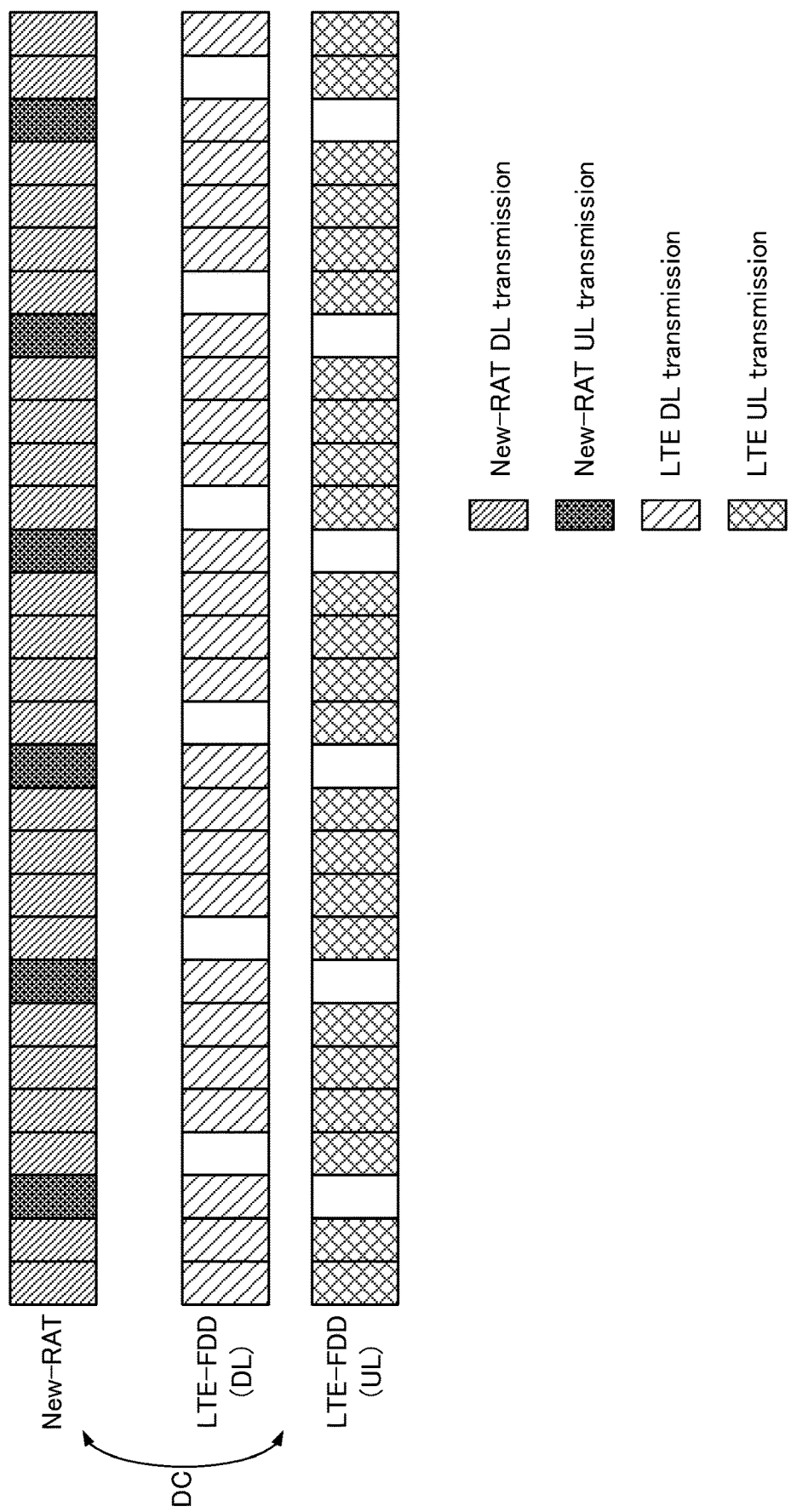
FIG. 2 is a diagram illustrating an example of a UL transmission/DL transmission control method according to a first embodiment.

FIG. 2 illustrates an example of a UL transmission and/or DL transmission control method in New-RAT and an LTE system to which the user terminal is connected with application of DC. In other words, the user terminal performs DC with a cell group configured in the LTE system (LTE CG) and a cell group configured in New-RAT (New-RAT CG).

FIG. 2 illustrates the case where there is configured a cell (LTE-FDD cell) using FDD in the LTE system (LTE CG) and the case where there is configured a cell (NewRAT-TDD cell) using TDD in the New-RAT (New-RAT-CG), but they are not intended to limit the present invention. The present invention is applicable to the case where the TDD cell is configured in the LTE system (LTE-TDD cell), and/or when the FDD cell is configured in the New-RAT (NewRAT-FDD cell).

A radio base station operating the LTE system (LTE base station) and a radio base station operating New-RAT (New-RAT base station) control scheduling such that no UL simultaneous transmission occurs in a given user terminal. For example, the LTE base station and/or New-RAT base station controls scheduling based on scheduling of the other communication system (UL transmission timing).

The LTE base station controls scheduling of the FDD cell (for example, UL allocation and/or DL allocation) so as not to perform UL transmission in a time interval that is UL subframe in New-RAT configured with the TDD cell. The LTE base station is able to receive information about the UL/DL configuration that is applied to the TDD cell in New-RAT in advance from the New-RAT base station by using the backhaul or the like.

For example, the LTE base station restricts transmission of UL grant and DL data so that UL transmission (for example, UL data transmission and HARQ-ACK transmission) is not performed from the LTE-FDD cell in the time interval (subframe) in which a UL signal is transmitted from the New-RAT cell. In the existing LTE system, the user terminal performs UL data (PUSCH) transmission four-subframe after the user terminal receives a UL grant. In addition, the user terminal performs ACK/NACK transmission four-subframe after the user terminal receives a DL signal (PDSCH). Therefore, the LTE base station restricts UL transmission for the LTE system in the UL transmission interval in the New-RAT cell and restricts the DL allocation four-subframe before the UL transmission interval.

Likewise, when the New-RAT base station is able to know scheduling (UL transmission timing) of the LTE base station in advance, the New-RAT base station controls UL allocation and/or DL allocation in the New-RAT cell based on the scheduling information. Thus, UL transmission by the user terminal is controlled not to overlap or to switch in the time direction in different communication systems (Time-switch uplink).

The LTE base station is able to permit UL simultaneous transmission of the user terminal in the cell group configured in the LTE system (LTE-CG). In addition, the New-RAT base station is able to permit UL simultaneous transmission of the user terminal in the cell group (CG) configured in the New-RAT.

The user terminal is able to control UL transmission by restricting the cell group (CG) to perform UL transmission, based on information (for example, UL/DL configuration, etc.) given from by MAC layer signaling, higher layer signaling or the like. That is, the user terminal is able to control UL transmission, assuming that the UL transmission is performed in the CG of one communication system during a given period. The user terminal may allocate all permissible maximum transmission power to the UL transmission of one CG by assuming the UL transmission is not performed only in the CG.

Further, the user terminal may report, to the radio base station, UE capability information (UE Capability) indicating that the user terminal is not capable of UL simultaneous transmission for a plurality of communication systems. The radio base station (LTE base station and/or New-RAT base station) is able to control scheduling of the user terminal based on UE capability information reported from the user terminal.

Suppose that the user terminal is instructed to perform UL simultaneous transmission for a plurality of communication systems by the radio base station (or by MAC layer signaling). Then, the user terminal is able to control UL transmission for a CG of a specific communication system preferentially. In this case, the user terminal is able to control not to perform (or to drop) UL transmission for the other CG.

When UL simultaneous transmission for the LTE system and the New-RAT is instructed, the user terminal may prioritize UL transmission for the CG of the LTE system and drop UL transmission for the CG of the New-RAT. With this configuration, it is possible to secure communication connectivity in a wide coverage of the LTE system.

Or, when reduction of delay and large-capacity communication are prioritized, the user terminal may prioritize UL transmission for the CG of the New-RAT and drop UL transmission for the CG of the LTE systems. Otherwise, the user terminal may prioritize UL transmission of a cell group including a given cell (for example, PCell) and drop UL transmission for a cell group that does not include the given cell.

Thus, by controlling not to perform UL simultaneous transmission for different communication systems in a given user terminal, even a user terminal incapable of UL simultaneous transmission becomes able to perform communication using the LTE system and the New-RAT. Here, if a user terminal is capable of UL simultaneous transmission for different communication systems, the radio base station may control scheduling by permitting the UL simultaneous transmission.

Second Embodiment

In the second embodiment, it is assumed that New-RAT is configured with a TTI (short TTI) that is shorter than a TTI of the LTE system (1 subframe). The TTI is a transmission time unit of one data packet (transport block) having being channel coded and may be a processing unit such as scheduling, link adaptation and so on.

Figure 3:
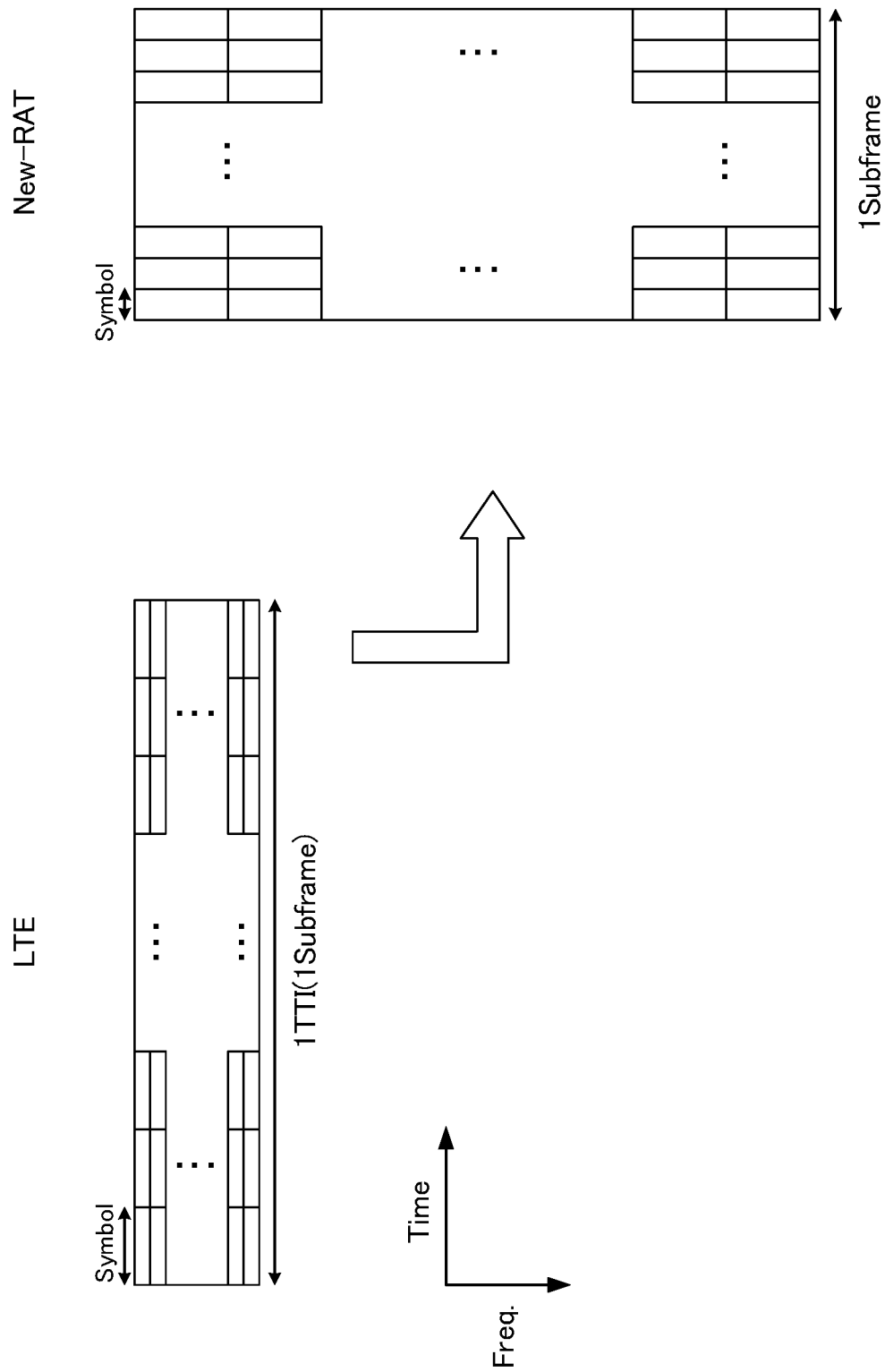
FIG. 3 is a diagram illustrating an example of a radio frame configuration of New RAT and a radio frame configuration of an LTE system.

As stated above, the New-RAT is expected to use higher frequencies than the LTE system. Therefore, the New-RAT is considered to use a radio frame configuration having a shorter OFDM symbol length by broadening the subcarrier interval (see FIG. 3). Thus, by shortening the TTI length (using a short TTI), it is possible to reduce the processing delay in control and shorten the delay time.

In addition, in the New-RAT, in order to reduce the control delay due to scheduling and HARQ-ACK, the UL data transmission and HARQ-ACK feedback timing may be greatly shortened from those of the LTE system. In the existing LTE system, the delay time since the user terminal receives a UL transmission instruction (UL grant) until the user terminal transmits UL data and the delay time since the user terminal receives a DL signal until the user terminal transmits an HARQ-ACK are 4 ms or more. In the New-RAT, these delay times may be considered to be shortened (for example, to 1 ms or less) for communication (see FIG. 4).

Figure 4A:
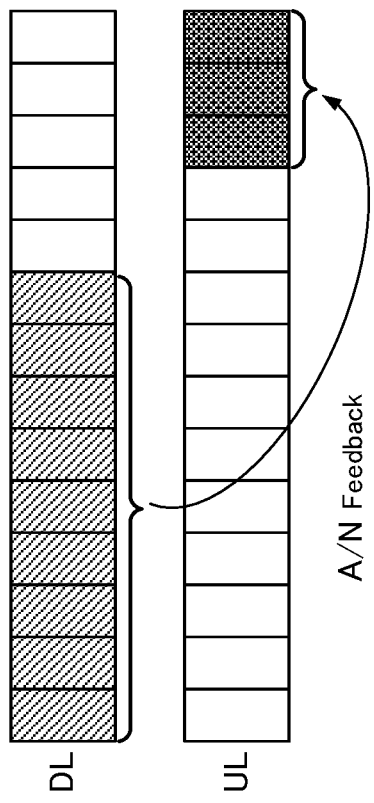
FIGS. 4A to 4C are diagrams illustrating an example of feedback timing of a transmission acknowledgement signal of New-RAT.
Figure 4B:
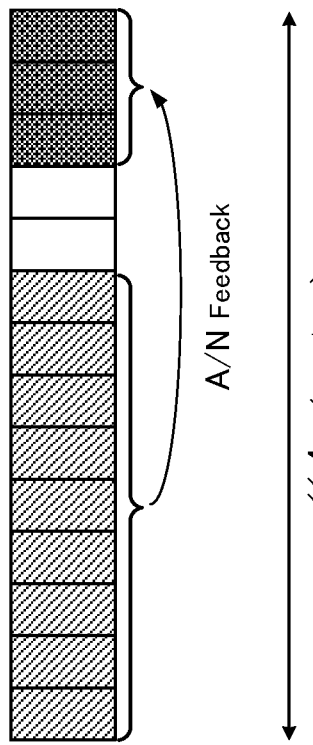
Figure 4C:
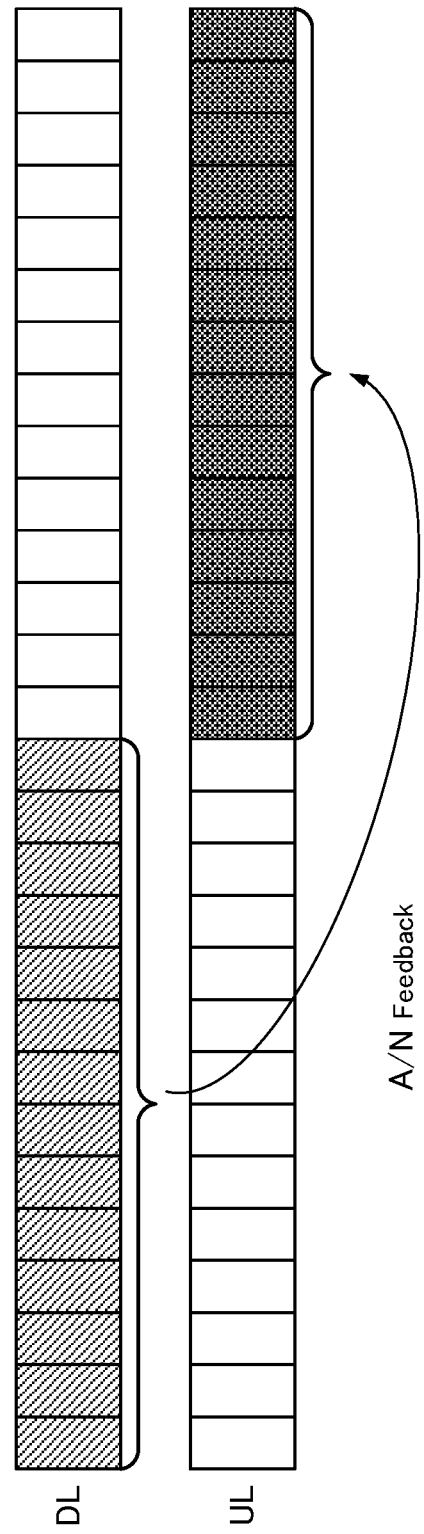

FIG. 4A illustrates the case where HARQ-ACK (ACK/NACK) feedback is performed in a TDD cell using short TTI in 1 ms or less. FIG. 4B illustrates the case where HARQ-ACK feedback is performed in an FDD cell using the short TTI in 1 ms or less. FIG. 4C illustrates the case where in an FDD cell using the short TTI, HARQ-ACK feedback for DL transmission is performed in a UL subframe following the DL subframe used in DL transmission.

Figure 5:
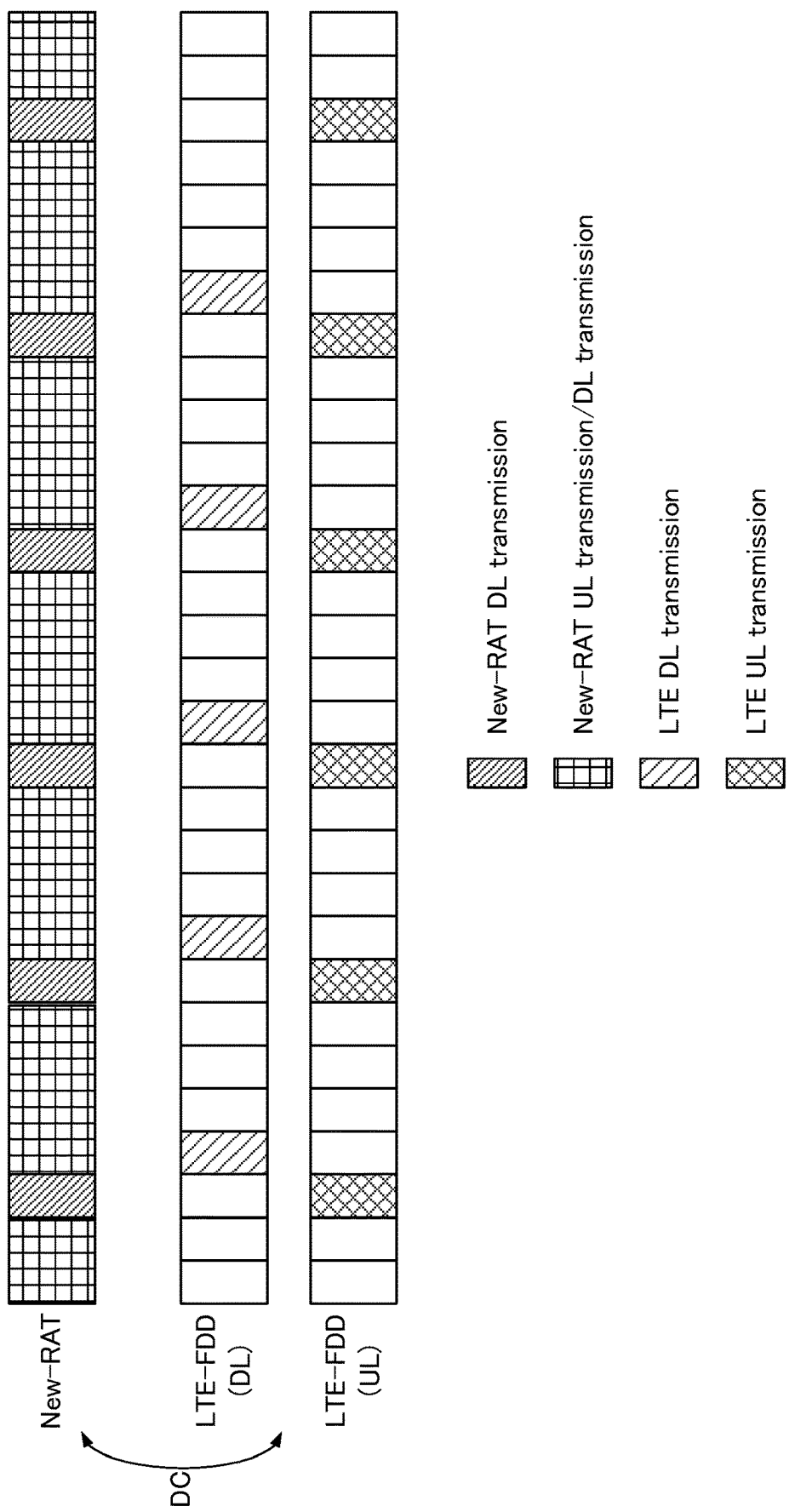
FIG. 5 is a diagram illustrating an example of a UL transmission/DL transmission control method when ACK/NACK feedback in FDD of the existing LTE system is applied.

Thus, in New-RAT, in order to realize reduction of delay, communication is considered to be performed by switching between UL transmission and DL transmission at a shorter transmission time interval (TTI) than that of the LTE system. Accordingly, when the user terminal is controlled not to perform UL simultaneous transmission for different communication systems, it is necessary to limit UL transmission in the LTE carrier during the time interval in which UL transmission and DL transmission are repeated using the short TTI in the New-RAT carrier. In addition, when the UL transmission is restricted in the LTE carrier (LTE cell), it becomes also necessary to restrict the DL signal allocation (see FIG. 5).

Particularly, when an FDD cell is configured in the LTE system, it is necessary to transmit uplink control information for each DL subframe (for example, HARQ-ACK) at given timing, and therefore, the DL signal allocation is greatly restricted by restriction on the UL transmission. Thus, when the restriction on the UL transmission in the New-RAT carrier is reduced, the time interval to perform UL transmission and DL transmission in the LTE carrier is shortened. As a result, it becomes difficult to receive important signals (system information and so on) transmitted from the LTE base station, which causes communication problems with the LTE base station with difficulty in ensuring the coverage.

In addition, in the case of UL transmission in the LTE carrier, UL transmission in the New-RAT carrier is restricted. Accordingly, when the time interval is reserved for UL transmission in the LTE carrier (for example, LTE-FDD cell) and increase the restriction on the UL transmission in the New-RAT carrier, the performance of the LTE carrier is assured, but it becomes difficult to achieve the effect of improving the performance in the New-RAT carrier sufficiently.

Then, in the present embodiment, when the user terminal transmits a UL signal such as HARQ-ACK, user data and so on in a communication system having a relatively long TTI (for example, LTE system), the user terminal controls to transmit them together in a given subframe. This embodiment will be described by way of a specific example below.

First Embodiment

In the first embodiment, it is assumed that the UL transmission timing of the LTE system is controlled using scheduling defined in TDD and/or HARQ-ACK transmission timing (for example, UL/DL configuration).

When transmitting UL signals (for example, PUCCH, PUSCH) in the LTE-FDD cell, the user terminal connected to the LT system and New-RAT controls the UL transmission by use of the UL/DL configuration defined in TDD. The case in which the user terminal transmits UL signals in the LTE-FDD cell is not limited to the case in which the LTE carrier (LTE-CG) is an FDD cell, but includes the case in which the LTE-CG includes a TDD carrier but a cell to transmit PUCCH in the LTE-CG (PUCCH cell) is an FDD cell.

Figure 6:
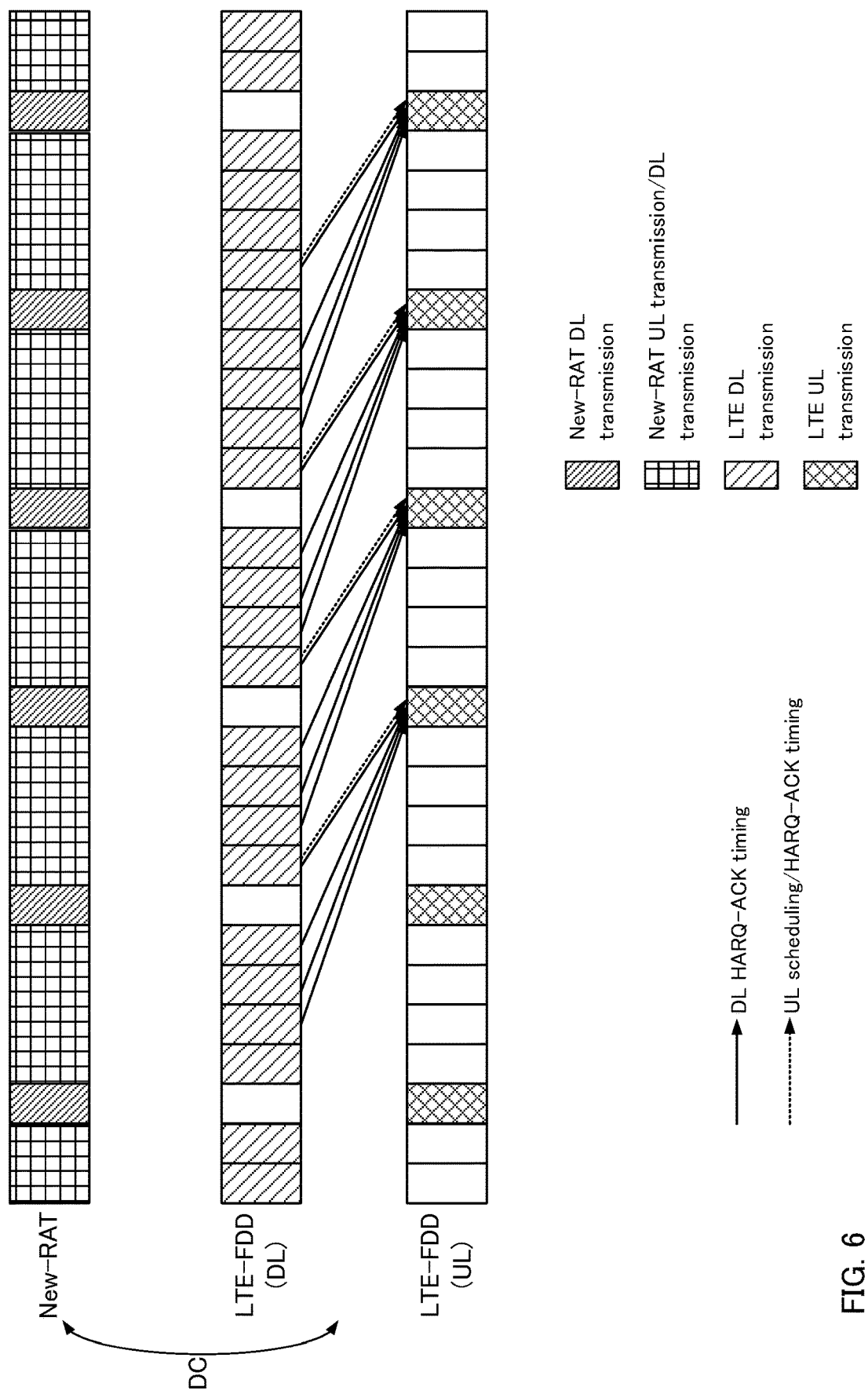
FIG. 6 is a diagram illustrating an example of a UL transmission/DL transmission control method according to a second embodiment.

FIG. 6 illustrates an example of the control method of UL transmission and DL transmission when the user terminal is connected to the LTE system and New-RAT using the short TTI and transmits uplink control signals in an FDD cell in the LTE system. In addition, it shows that the user terminal transmits an UL signal of the FDD cell (UL data and/or HARQ-ACK) based on the transmission timing of the UL/DL configuration 2 (UL-DL configuration #2) defined in the TDD. Note that the UL/DL configuration (DL-reference UL-DL configuration) applied in the LTE-FDD cell (FDD carrier) is not limited to the UL/DL configuration 2.

In the UL/DL configuration 2 defined in the TDD, the subframe 2 (UL subframe 2) and the subframe 7 (UL subframe) are used to ACK/NACKs for four DL subframes (see FIG. 8A). In addition, the user data is also transmitted using the subframe 2 and the subframe 7.

The user terminal controls to perform UL transmission using the subframe 2 and the subframe 7 in the LTE carrier (or LTE-CG). In addition, the LTE base station provides a UL transmission instruction (UL grant) to the user terminal so that UL transmission is performed in the subframe 2 and the subframe 7.

In addition, the New-RAT base station and/or user terminal controls not to perform UL transmission in the New-RAT during the time intervals of the subframes 2 and 7 of the LTE system. For example, the New-RAT base station and/or user terminal is able to control not to perform DL transmission in TTIs of the New-RAT corresponding to the subframes 2 ad 7 of the LTE system. On the other hand, in time intervals excluding the subframes 2 and 7 of the LTE system, it is possible to perform communication by switching between UL transmission and DL transmission in the New-RAT.

Further, the LTE base station and/or New-RAT base station is able to provide the user terminal with information about scheduling applied in the FDD carrier of the LTE system (or LTE-CG) and/or HARQ timing by higher layer signaling or the like. For example, the LTE base station is able to configure the user terminal with a given UL/DL configuration defined in the TDD as information about the transmission timing in the LTE-FDD cell. Here, the UL/DL configuration configured in the user terminal may be called reference UL/DL configuration. The user terminal changes the transmission timing of the UL data and the HARQ timing to the transmission timing of the reference UL/DL configuration in the carrier configured with the reference UL/DL configuration (for example, LTE carrier, LTE-FDD cell, LTE-CG).

Thus, in the system having a relatively longer TTI (for example, LTE system), as UL signals are transmitted together in a given subframe, it is possible to reduce the restriction on the DL allocation subframe of the LTE carrier (LTE-CG) and to perform communication while securing enough UL transmission occasions of other communication systems.

Modified Embodiment

In the TDD-FDD CA where PCell is TDD carrier (TDD-PCell), the user terminal may control UL transmission and DL reception by using the transmission timing applied to the DD carrier that is SCell (FD-SCell). In the transmission method applied to FDD-SCell, scheduling and/or DL HARQ timing is defined so that DL allocation to all DL subframes in the LTE-FDD cell can be allowed.

Figure 7:
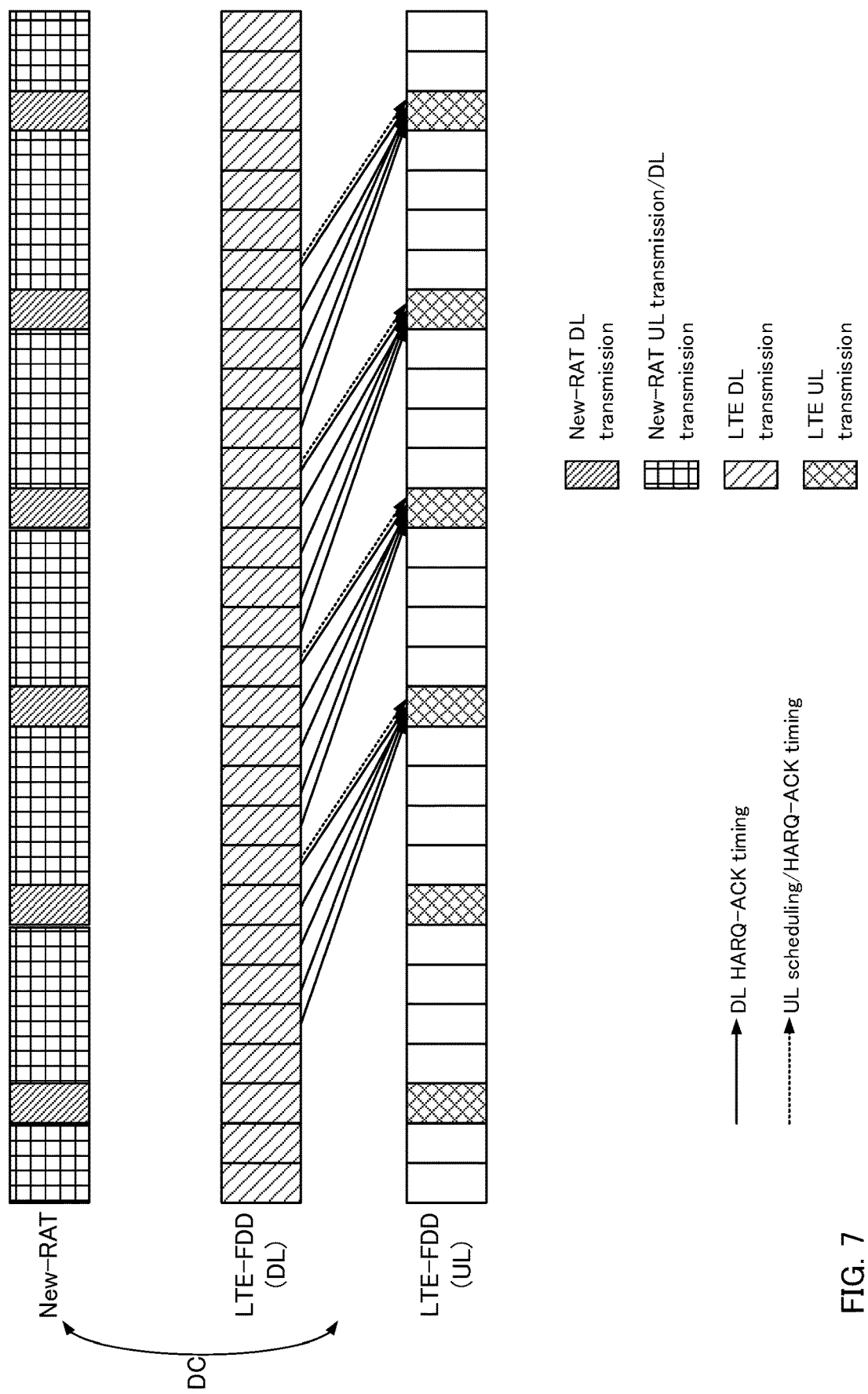
FIG. 7 is a diagram illustrating another example of the UL transmission/DL transmission control method according to the second embodiment.

FIG. 7 illustrates an example of the control method of UL transmission and DL transmission when the user terminal is connected to the LTE system and the New-RAT using a short TTI and transmits an uplink control signal in the FDD cell in LTE-CG. Here, it is assumed that in TDD-FDD CA in which TDD is for PCell, the user terminal controls UL transmission in the LTE-FDD cell by using the HARQ timing (here, UL/DL configuration 2) applied to the FDD-SCell. Here, the reference UL/DL configuration (DL-reference UL-DL configuration) applied to the FDD carrier is not limited to UL/DL configuration 2.

In the reference UL/DL configuration 2 defined for FDD-SCell in TDD-FDD CA where TDD is for PCell, the subframe 2 and the subframe 7 are used to feed back ACK/NACKs for five DL subframes (see FIG. 8B). That is, in the case of FIGS. 6 and 8B, Dl transmission in the subframes 2 and 7 is not supported, while in the second embodiment, DL transmission is able to be supported in the subframes 2 and 7 (see FIGS. 7 and 8B). With this configuration, DL transmission is able to be performed using all DL subframes in the LTE-FDD cell.

The user terminal controls to perform UL transmission by using the subframe 2 and the subframe 7 for the LTE carrier (or LTE-CG). In addition, the LTE base station provides the user terminal with a UL transmission instruction (UL grant) so that UL transmission is performed in the subframe 2 and the subframe 7.

In addition, the New-RAT base station and/or the user terminal controls not to perform UL transmission in New-RAT during the time intervals of the subframes 2 and 7 of the LTE system. For example, the New-RAT base station and/or user terminal are able to control only to perform DL transmission in TTIs of the New-RAT corresponding to the subframes 2 and 7 of the LTE system. On the other hand, they are able to perform communication by switching between UL transmission and DL transmission appropriately in New-RAT outside the time intervals of the subframes 2 and 7 of the LTE system.

Thus, by using the UL transmission timing defined for FDD-SCell in TDD-FDD CA in which TDD is of PCell, it is possible to perform communication by using all the DL subframes of the LTE carrier (for example, LTE-FDD cell).

Second Embodiment

The radio base station is able to provide the user terminal with information about the reference UL/DL configuration to apply to the FDD carrier of the LTE system (or LTE-CG in which the FDD carrier is a PUCCH cell).

For example, the LTE base station configures the user terminal with a given reference UL/DL configuration by using higher layer signaling (for example, RRC signaling or the like). In this case, the user terminal is able to apply existing scheduling and/or HARQ timing unless it receives information about the reference UL/DL configuration from the radio base station. On the other hand, when the user terminal is configured with the reference UL/DL configuration by the radio base station, the user terminal is able to apply the transmission timing based on the reference UL/DL configuration as configured, irrespective of whether the New-RAT cell group is configured or not (Active or Schedule).

Otherwise, the radio base station may designate application of the reference UL/DL configuration for the user terminal by higher layer signaling and remove the application of the reference UL/DL configuration by MAC CE. In this case, when receiving MAC CE, the user terminal is able to control UL transmission by switching the transmission and reception timing control based on the reference UL/DL configuration to the existing scheduling and/or HARQ timing. Here, the indication to the user terminal by using MAC CE may be indication about setting/removal of the New-RAT cell group (Activation/de-activation).

Otherwise, the radio base station may be configured to switch application of the reference UL/DL configuration in the user terminal dynamically by using physical signaling (PHY signaling). For example, the radio base station may be able to use the downlink control information (PDCCH) to dynamically change the timing that is configured in advance in the user terminal by higher layer signaling.

The user terminal configured with the reference UL/DL configuration controls transmission and reception by using the timing based on the reference UL/DL configuration in a given time interval in accordance with the instruction of the physical layer signaling. In this case, the user terminal uses the existing scheduling and/or HARQ timing as far as the user terminal does not receive physical signaling. In addition, the physical layer signaling may be used to provide the user terminal with a given reference UL/DL configuration.

Otherwise, when the user terminal receive removal of application of the reference UL/DL configuration by the physical signaling, the user terminal may switch to apply the existing transmission timing (for example, scheduling and/or HARQ timing defined in LTE-FDD) in a given time interval. In this case, after being configured with the reference UL/DL configuration by higher layer signaling, the user terminal applies the transmission timing based on the reference UL/DL configuration as long as it receives an indication of removal by physical layer signaling.

The physical signaling may be eIMTA signaling used in change of the TDD UL/DL configuration in the existing LTE system.

Third Embodiment

As illustrated in the first embodiment above, the user terminal controlling the transmission timing in the FDD carrier based on the reference UL/DL configuration is applied with scheduling and/or HARQ timing that is the same as in TDD even in the FDD carrier. Accordingly, the LTE base station preferably uses a DCI format for TDD, not an existing DCI format for FDD, as downlink control information (DCI format) to provide scheduling (UL allocation and DL allocation) to the user terminal.

In this case, the user terminal configured with the reference UL/DL configuration in the FDD carrier performs reception processing (for example, blind decoding) on the assumption that the DCI format of a downlink control channel (PDCCH and/or EPDCCH) received in the FDD carrier is a DCI format defined for TDD.

In TDD, the number of HARQ processes (HPN) is set to be greater than the number of HARQ processes (in 3 bits) in FDD. In addition, in TDD, wen UL/DL configurations 1-6 are used, the radio base station provides the user terminal with downlink control information including DAI (Downlink Assignment Indicator (Index)) that indicates downlink assignment information. Further, in TDD, when the UL/DL configuration 0 is used, the radio base station provides the user terminal with downlink control information including an UL index.

Accordingly, the user terminal configured with the reference UL/DL configuration for the FDD carrier is able to perform the reception processing of the downlink control information on the assumption that the number of HARQ processes in the DCI format is in 4 bits. Further, when the UL/DL configurations 1-6 are configured, the user terminal is able to perform the reception processing of the downlink control information on the assumption that the DCI format includes a DAI field (2 bits) indicating downlink assignment information. In addition, when the UL/DL configuration 0 is used, the user terminal is able to perform the reception processing of the downlink control information on the assumption that it includes a UL index field (2 bits).

Further, the radio base station is able to configure the number of HARQ processes of the FDD carrier in the LTE system (and SCell included in the same CG such that the FDD carrier is for PUCCH cell) based on the reference UL/DL configuration to provide to the user terminal (see FIG. 9).

FIG. 9A illustrates a table indicating the relationship between the UL/DL configuration and the number of HARQ processes in TDD or TDD CA. As shown in the first embodiment (see FIGS. 6 and 8A), when the reference UL/DL configuration is configured in the FDD carrier, the LTE base station and the user terminal are able to recognize the maximum value of the number of DL HARQ processes based on the reference UL/DL configuration as configured and the table of FIG. 9A.

FIG. 9B illustrates a table indicating the relationship between the UL/DL configuration and the number of DL HARQ processes for FDD-SCell and in TDD-FDD CA where TDD is of PCell. As shown in the modification to the first embodiment (see FIGS. 7 and 8B), when the reference UL/DL configuration is configured in the FDD carrier, the LTE base station and the user terminal are able to recognize the maximum value of the number of DL HARQ processes based on the reference UL/DL configuration as configured and the table of FIG. 9B.

FIG. 9C illustrates a table indicating the relationship between the UL/DL configuration and the number of UL HARQ processes in TDD or TDD CA. As shown in the first embodiment or the modification, when the reference UL/DL configuration is configured for the FDD carrier, the LTE base station and the user terminal are able to know the maximum value of the number of UL HARQ processes based on the reference UL/DL configuration as configured and the table of FIG. 9C.

Fourth Embodiment

As illustrated in the first embodiment above, when the user terminal controls UL transmission of an LTE-FDD cell (LTE-CG, LTE carrier) by using the reference UL/DL configuration, the UL transmission timing may be controlled to be dispersed between user terminals. For example, a user terminal-specific offset may be applied to scheduling based on the reference UL/DL configuration and/or HARQ timing.

Figure 10:
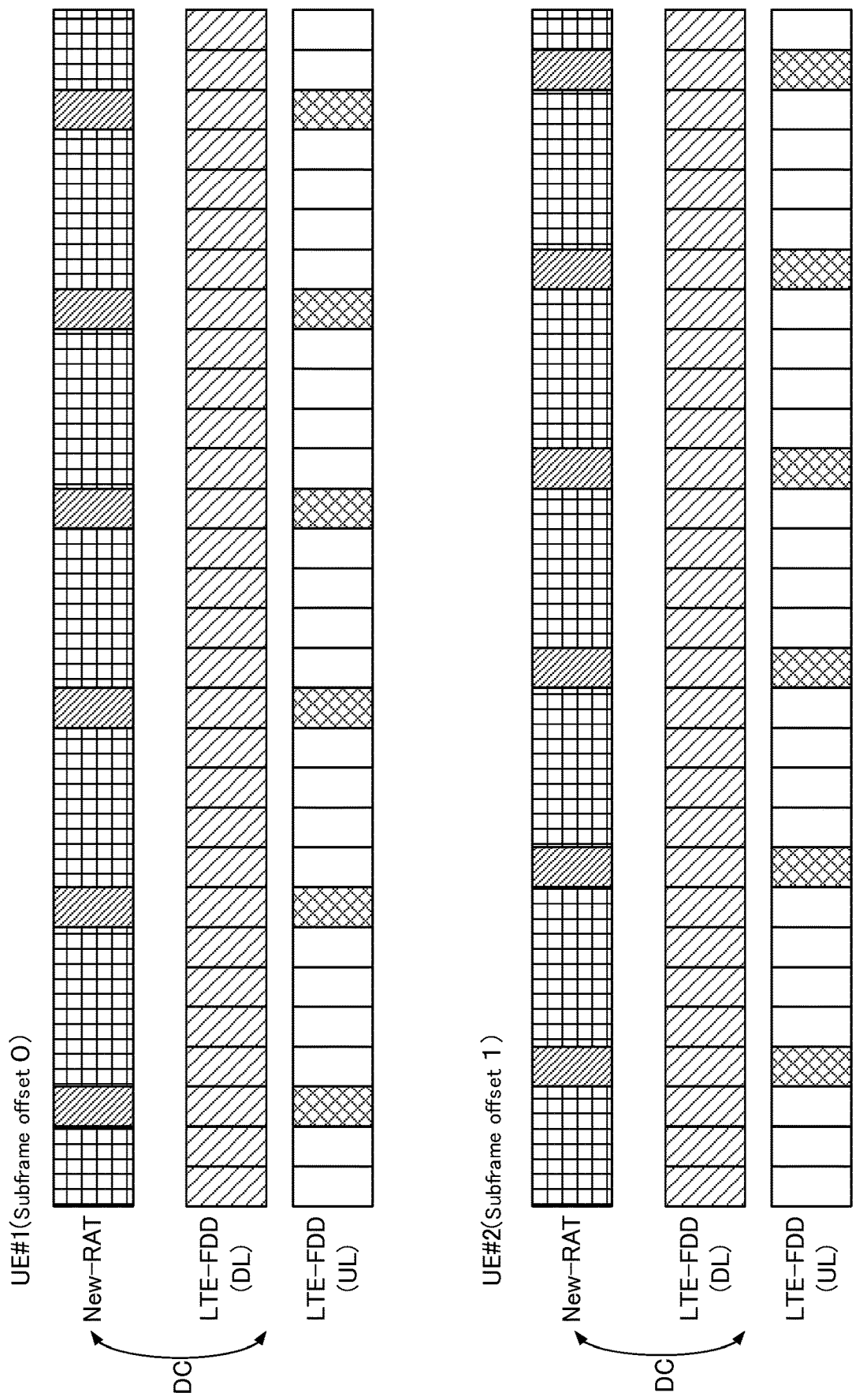
FIG. 10 is a diagram illustrating another example of the UL transmission/DL transmission control method according to the second embodiment.

FIG. 10 illustrates the case where a first user terminal (UE #1) using the reference UL/DL configuration 2 is applied with subframe offset 0 and a second user terminal (UE #2) is applied with a subframe offset 1. In this case, the first user terminal performs UL transmission using the subframes 2 and 7. On the other hand, the user terminal performs UL transmission sing the subframes 3 and 8 obtained by adding offset 1 to the transmission timing based on the reference UL/DL configuration. With this configuration, it is possible to prevent UL signals transmitted from user terminals configured with the same UL/DL configuration from concentrating on a specific subframe and to distribute them over subframes.

The LTE base station is able to provide the user terminal using the reference UL/DL configuration with information about a subframe offset by higher layer signaling, MAC CE, physical signaling and so on. For example, the LTE base station provides the user terminal with information (X value) about an offset applied to the table illustrated in FIGS. 8A and 8B explained above (see FIGS. 11A and 11B). The user terminal controls UL transmission based on information about the offset value and the reference UL/DL configuration and offset value provided from the LTE base station.

Further, the New-RAT base station is able to obtain information about the offset value from the LTE base station and control UL transmission timing in the New-RAT cell.

Third Embodiment

In the third embodiment, description is made of the transmission method of a transmission acknowledgement signal for a DL signal transmitted from the New-RAT in the time interval of UL transmission of the LTE system.

Figure 12:
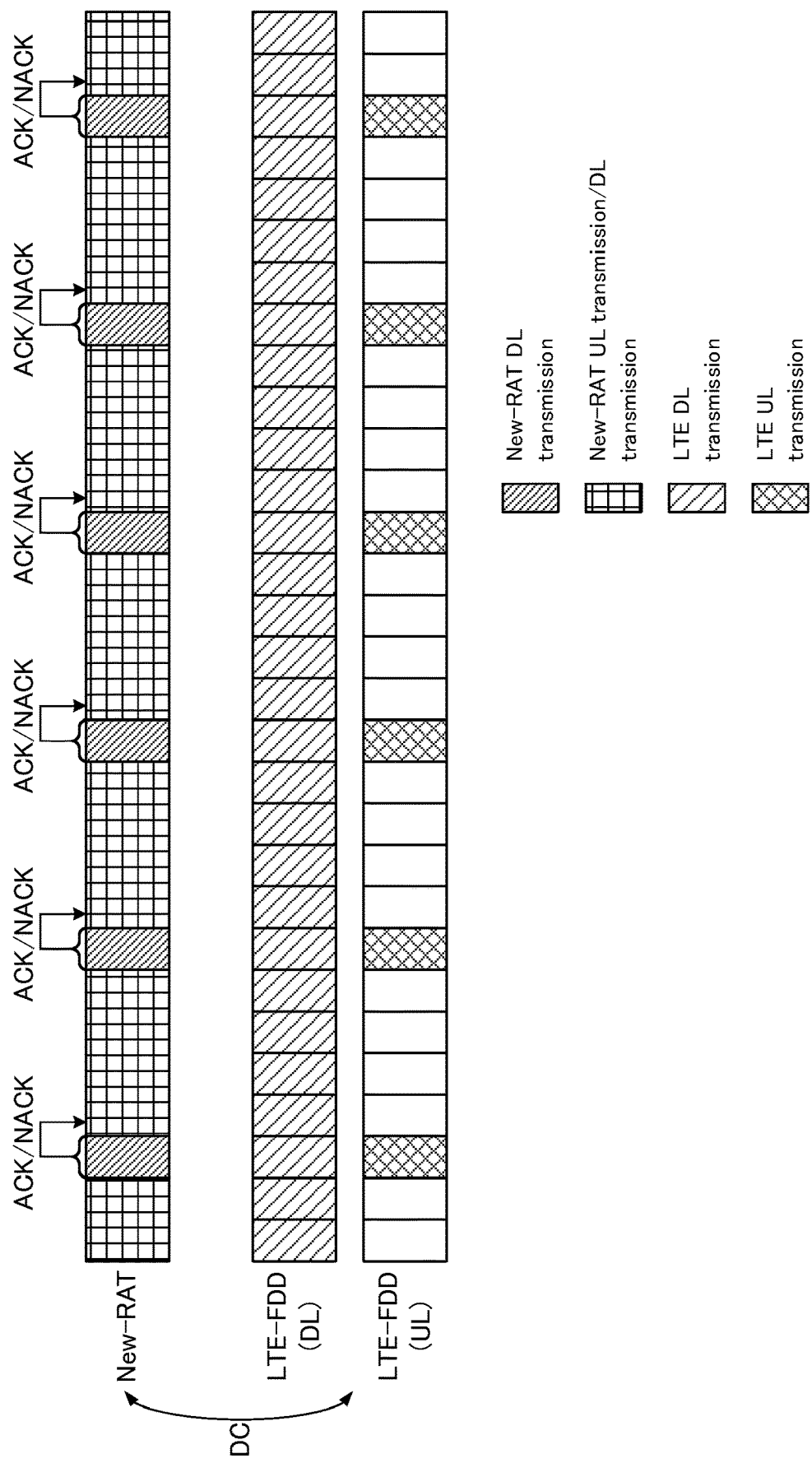
FIG. 12 is a diagram illustrating an example of the UL transmission/DL transmission control method according to a third embodiment.

FIG. 12 shows that user terminal controls UL transmission in the LTE carrier using the reference UL/DL configuration and receives a DL signal without performing UL transmission for the New-RAT in the UL transmission interval of the LTE carrier. Here, the New-RAT base station and the user terminal are able to perform communication by switching DL transmission and UL transmission using the short TTI in the New-RAT, outside the time interval of UL transmission of the LTE system.

In the time interval of UL transmission for the LTE carrier, the user terminal is only able to perform DL reception in the New-RAT, and the user terminal is not able to transmit, in this time interval, a transmission acknowledgement signal of the DL data received in the time interval. Accordingly, once the UL transmission in the LTE system is finished and UL transmission is allowed in the New-RAT, the user terminal feeds back the transmission acknowledgement signal of the DL data received in the time interval.

That is, the user terminal controls to feedback the transmission acknowledgement signal of the DL signal transmitted in the New-RAT in the time interval in which UL transmission is performed in the LTE system, at a timing later than a transmission acknowledgement signal for a DL signal received in the New-RAT outside the time interval. With this configuration, the user terminal is also able to feed back the transmission acknowledgement signal appropriately for the DL signal transmitted in the New-RAT in the time interval in which UL transmission is performed in the LTE system.

In this case, the user terminal is able to apply bundling by exclusive OR (ACK/NACK bundling) to transmission acknowledgement signals for DL signals transmitted in New-RAT in the time interval in which UL transmission is performed in the LTE system. Otherwise, the user terminal may feed back the transmission acknowledgement signals for DL signals transmitted in the New-RAT in the time interval by using mutually different bits.

The user terminal and/or New-RAT base station is able to know the time interval to perform UL transmission in the LTE system implicitly from the reference UL/DL configuration configured in the LTE carrier.

Thus, by controlling feedback (for example, transmission timing) of a transmission acknowledgement signal for a DL signal transmitted in the New-RAT in the time interval in which UL transmission is performed in the LTE system, it is possible to feed back ACK/NACK appropriately even in the case the short TTI is used in the New-RAT.

Radio Communication System

The following description concerns the configuration of a radio communication system according to an embodiment of the present invention. This radio communication system is applied with each of the embodiments and aspects explained above. Furthermore, the communication methods of the respective embodiments and aspects each can be applied independently, or in combination.

Figure 13:
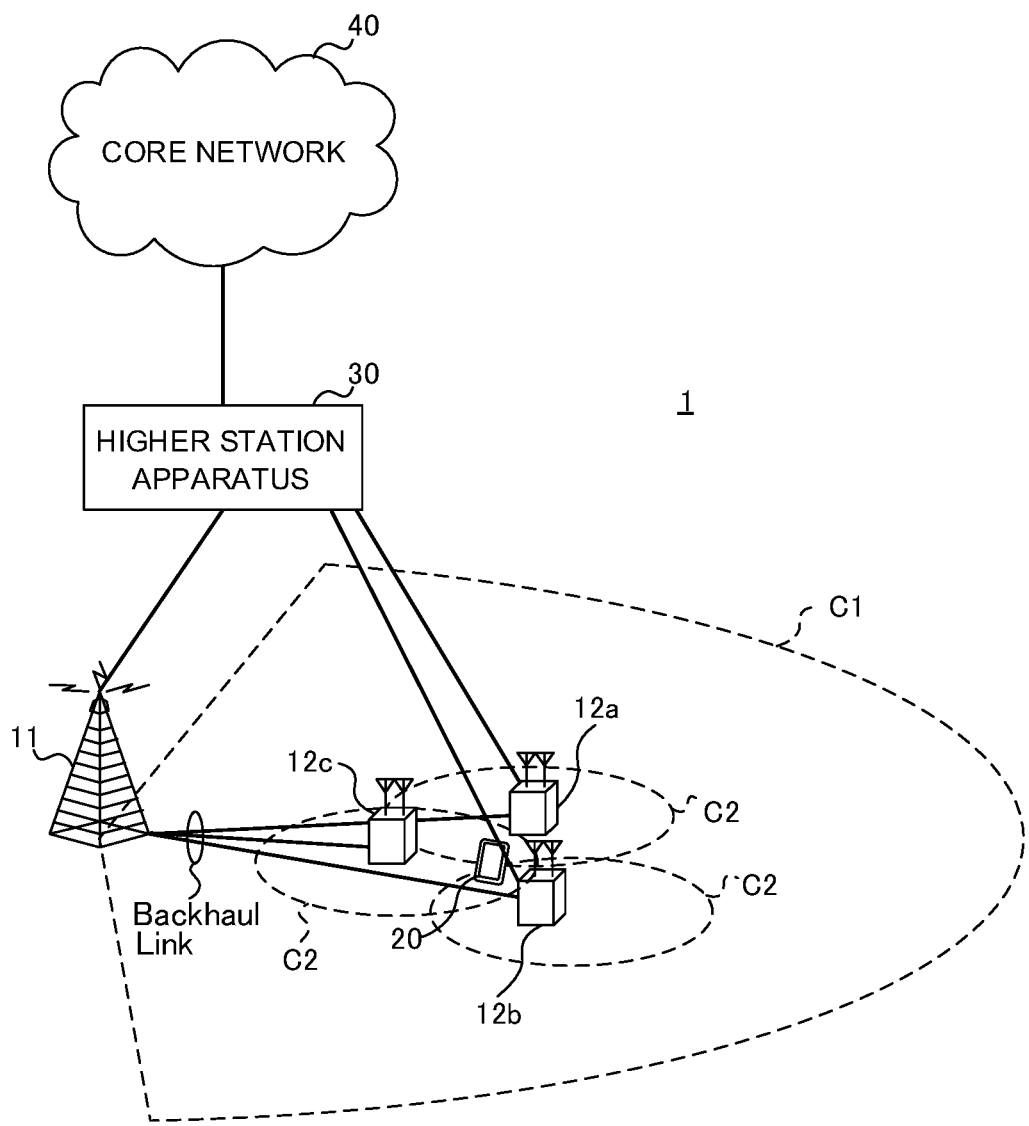
FIG. 13 is a diagram schematically illustrating an example of the configuration of a radio communication system according to a present embodiment.

FIG. 13 shows an example of a schematic configuration of the radio communication system according to an embodiment of the present invention. The radio communication system 1 (for example, LTE system) and the radio communication system 2 (for example, New-RAT) can apply carrier aggregation (CA) and/or dual connectivity (DC). Note that this radio communication system 2 may also be called 5G, or FRA (Future Radio Access), etc.

In FIG. 13, there are a radio base station 11 which forms a macro cell C1 (for example, LTE base station), and radio base stations 12a through 12c (for example, New-RAT base stations) provided within the macro cell C1 and each forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (CCs) (e.g., six or more CCs). Further, UL transmission and/or DL transmission between the user terminal 20 and the radio base station 12 may use the short TTI.

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier (for example, New-RAT carrier) having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station 12 (or between two radio base stations 12).

The radio base station 11 and each radio base station 12 are connected to a higher station apparatus 30, and are connected to the core network 40 via the higher station apparatus 30. The higher station apparatus 30 includes, but is not limited to, an access gateway apparatus, a radio network controller (RNC), and a mobility management entity (MME), etc. Furthermore, each radio base station 12 may be connected to the higher station apparatus 30 via the radio base station 11.

Note that the radio base station 11 is a radio base station having a relatively wide coverage, and may be called a macro base station, an aggregation node, eNB (eNodeB), a transmission/reception point or an LTE base station. Furthermore, the radio base station 12 is a radio base station having a local coverage, and may be called a small base station, a micro base station, a pico base station, a femto base station, HeNB (Home eNodeB), RRH (Remote Radio Head), a transmission/reception point, or New-RAT base station, etc. Hereinafter, the radio base stations 11 and 12 will be generally referred to as "a radio base station 10" in the case where they are not distinguished from each other.

Each user terminal 20 is compatible with each kind of communication schemes such as LTE, LTE-A, etc., and also includes a fixed communication terminal in addition to a mobile communication terminal.

In the radio communication systems 1 and 2, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. The uplink and downlink radio access schemes are not limited to this combination and OFDM may be applied to uplink.

In the radio communication systems 1 and 2, used as downlink channels are a downlink shared channel (PDSCH: Physical Downlink Shared Channel) that is shared by each user terminal 20, a broadcast channel (PBCH: Physical Broadcast channel), and a downlink L1/L2 control channel, etc. PDSCH is used to transmit user data and higher layer control information, and an SIB (System Information Block). Furthermore, PBCH is used to an MIB (Master Information Block), etc.

The downlink L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. PDCCH is used to transmit downlink control information (DCI), etc., which includes PDSCH and PUSCH scheduling information. PCFICH is used to transmit the number of OFDM symbols used in the PDCCH. PHICH is used to transmit a HARQ transmission acknowledgement signal (ACK/NACK) for the PUSCH. An EPDCCH that is frequency-division-multiplexed with a PDSCH (downlink shared data channel) can be used for transmitting the DCI in the same manner as the PDCCH.

In the radio communication systems 1 and 2, used as uplink channels are an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc. The PUSCH is used to transmit user data and higher layer control information. Uplink control information (UCI) including at least one of transmission acknowledgement information (HARQ-ACK) and radio quality information (CQI), etc., is transmitted via the PUSCH or the PUCCH. The PRACH is used to transmit a random access preamble for establishing a connection with a cell.

Radio Base Station

Figure 14:
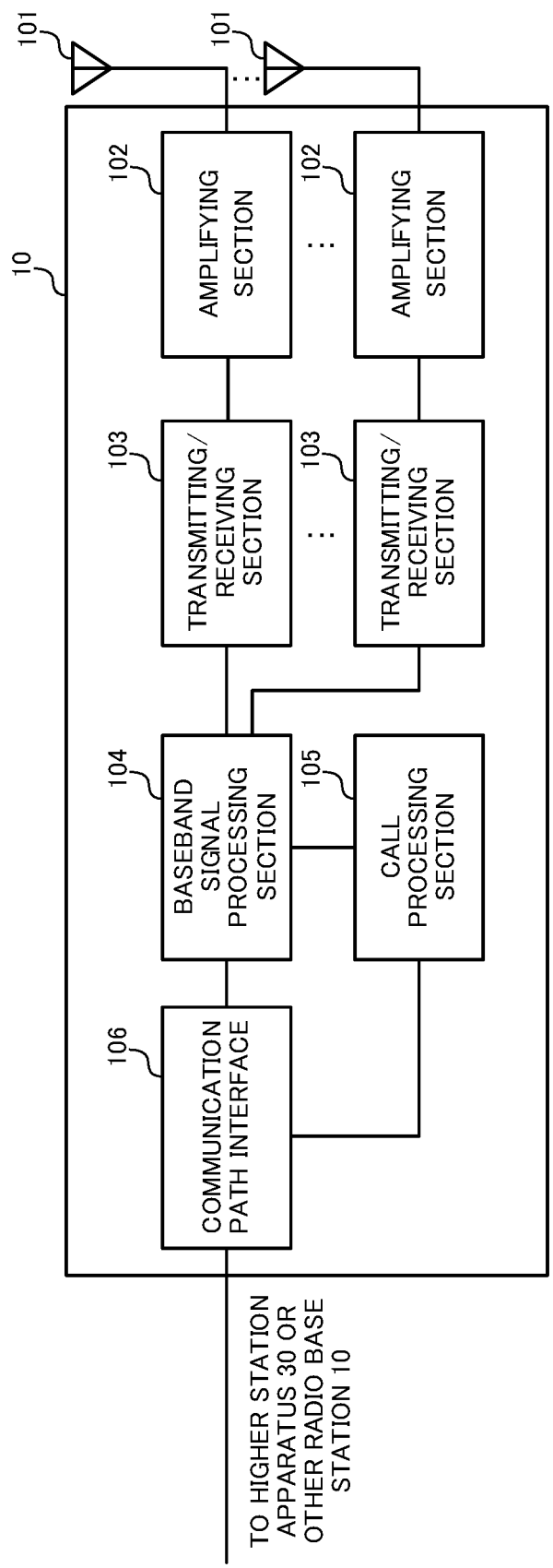
FIG. 14 is a diagram illustrating an example of the overall configuration of a radio base station according to the present embodiment.

FIG. 14 is a diagram illustrating an overall configuration of the radio base station according to the embodiment of the present invention. The radio base station 10 is configured to include a plurality of transmission/reception antennas 101, amplifying sections 102, transmitting/receiving sections 103, a baseband signal processing section 104, a call processing section 105 and a communication path interface 106. Note that the transmitting/receiving sections 103 may be each configured of a transmission section and a reception section.

User data that is to be transmitted on the downlink from the radio base station 10 to the user terminal 20 is input from the higher station apparatus 30, via the communication path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmitting/receiving sections 103. Furthermore, in regard to downlink control signals, transmission processing is performed, including channel coding and inverse fast Fourier transform, and resultant signals are also transferred to the transmitting/receiving sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

Each of the transmitting/receiving sections (reception sections) 103 receives UL signals (for example, UL data, HARQ-ACK, etc.) transmitted from the user terminal. The transmitting/receiving section (transmission section) 103 transmits DL signals (for example, UL grant). The transmitting/receiving section (transmission section) 103 transmits information about a reference UL/DL configuration that the user terminal uses as for the UL transmission timing, by using at least one of higher layer signaling, MAC CE (Media Access Control Control Element) and physical signaling. Note that each transmitting/receiving section 103 may be configured as a transmitter/receiver, a transmission/reception circuit or a transmission/reception device as explained based on common knowledge in the technical field to which the present invention pertains. The transmitting/receiving section 103 may be configured of an integral reception section, or may be configured as a transmission section and a reception section.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the communication path interface 106. The call processing section 105 performs call processing such as setting up and releasing a communication channel, manages the state of the radio base station 10, and manages the radio resources.

The communication path interface 106 performs transmission and reception of signals with the higher station apparatus 30 via a predetermined interface. Furthermore, the communication path interface 106 can perform transmission and reception of signals (backhaul signaling) with a neighboring radio base station 10 via an inter-base-station interface (for example, optical fiber or X2 interface compliant with CPRI (Common Public Radio Interface)).

Figure 15:
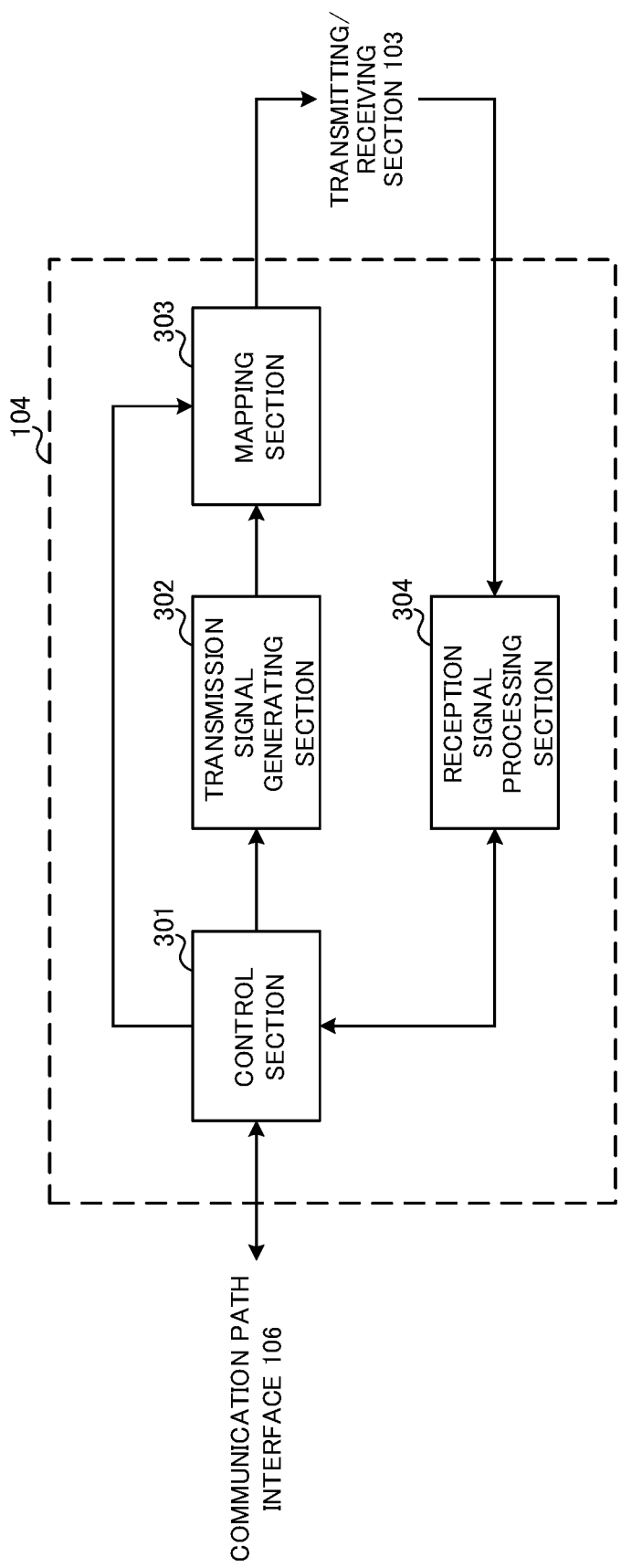
FIG. 15 is a diagram illustrating an example of a functional configuration of the radio base station according to the present embodiment.

FIG. 15 is a diagram illustrating the functional configuration of the radio base station according to the present embodiment. Note that although FIG. 15 mainly shows functional blocks of the features of the present embodiment, the radio base station 10 is also provided with other functional blocks that are necessary for carrying out radio communication. As illustrated in FIG. 15, the baseband signal processing section 104 includes a control section (scheduler) 301, a transmission signal generating section (generating section) 302, a mapping section 303 and a reception signal processing section 304.

The control section (scheduler) 301 controls scheduling (for example, resource allocation) of downlink control signals transmitted on PDCCH and/or EPDCCH and downlink data signals transmitted on PDSCH. In addition, the control section also controls scheduling of the system information, synchronization signals, paging information, CRS (Cell-specific Reference Signal), CSI-RS (Channel State Information Reference Signal and so on. Further, the control section controls scheduling of uplink data signals transmitted on PUSCH, uplink control signals transmitted on PUCCH and/or PUSCH and so on.

The control section 301 controls transmission of a UL grant to prevent the user terminal from transmitting UL signals simultaneously for different communication systems. The control section 301 may be configured of a controller, a control circuit or a control device as explained based on the common knowledge in the field to which the present invention pertains.

The transmission signal generating section 302 generates a DL signal (including a downlink data signal and a downlink control signal) based on an instruction from the control section 301, and outputs the generated signal to the mapping section 303. Specifically, the transmission signal generating section 302 generates a downlink data signal (PDSCH) including user data and outputs it to the mapping section 303. In addition, the transmission signal generating section 302 generates a downlink control signal (PDCCH/EPDCCH) including DCI (UL grant, DL assignment) and outputs the signal to the mapping section 303. Note that the transmission signal generating section 302 may be configured of a signal generator, a signal generating circuit or a signal generating device as explained based on the common knowledge in the technical field to which the present invention pertains.

Based on an instruction from the control section 301, the mapping section 303 maps the DL signal generated in the transmission signal generating section 302 to predetermined radio resources to output to the transmitting/receiving sections 103. The mapping section 303 can be configured of a mapper, a mapping circuit and a mapping device as explained based on common knowledge in the technical field to which the present invention pertains.

The reception signal processing section 304 performs receiving procession (e.g., demapping, demodulation, and decoding, etc.) on UL signals (HARQ-ACK, PUSCH, etc.) transmitted from the user terminal 20. The result of this processing is output to the control section 301.

The reception signal processing section 304 may be configured of a signal processor, a signal processing circuit, or a signal processing device; or may be configured as a measurer, a measuring circuit or a measuring device as explained based on common knowledge in the technical field to which the present invention pertains.

User Terminal

Figure 16:
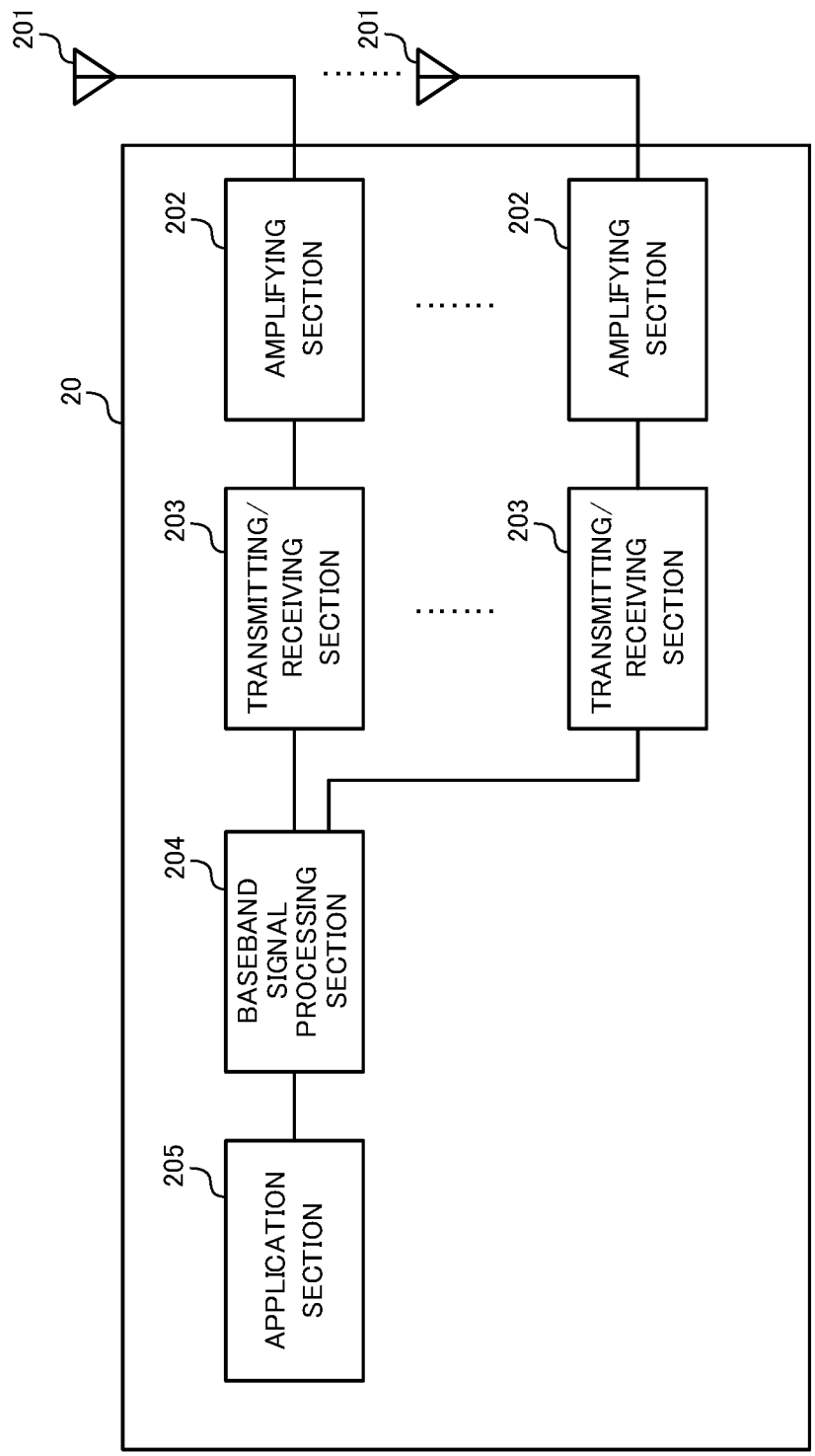
FIG. 16 is a diagram illustrating an example of the overall configuration of a user terminal according to the present embodiment.

FIG. 16 is a diagram showing an overall structure of a user terminal according to an embodiment of the present invention. The user terminal 20 is provided with a plurality of transmission/reception antennas 201 for MIMO communication, amplifying sections 202, transmitting/receiving sections 203, a baseband signal processing section 204 and an application section 205. Each transmitting/receiving section 203 may be configured of a transmission section and a reception section.

Radio frequency signals that are received in the plurality of transmission/reception antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, which signals are thereafter output to the baseband signal processing section 204.

Each transmission/reception (reception section) 203 receives DL signals transmitted from a plurality of communication systems. In addition, the transmitting/receiving section (transmission section) 203 transmits UL signals to a plurality of communication systems. The transmitting/receiving section (reception section) 203 is able to receive information about a reference UL/DL configuration to use as for the timing of UL transmission by the user terminal by using at least one of higher layer signaling, MAC CE (Media Access Control Control Element) and physical signaling. In addition, the transmitting/receiving section (reception section) 203 is able to receive information about a resource and/or a signal sequence to transmit a transmission acknowledgement signal in the existing downlink control information (for example, DL assignment). Note that the transmitting/receiving section 203 may be a transmitter/receiver, a transmission/reception circuit or a transmission/reception device as explained based on the common knowledge in the technical field to which the present invention pertains.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmission/reception 203. The radio frequency signal frequency-converted in the transmitting/receiving section 203 is amplified in the amplifying section 202 and then is transmitted from the transmission and reception antenna 201.

Figure 17:
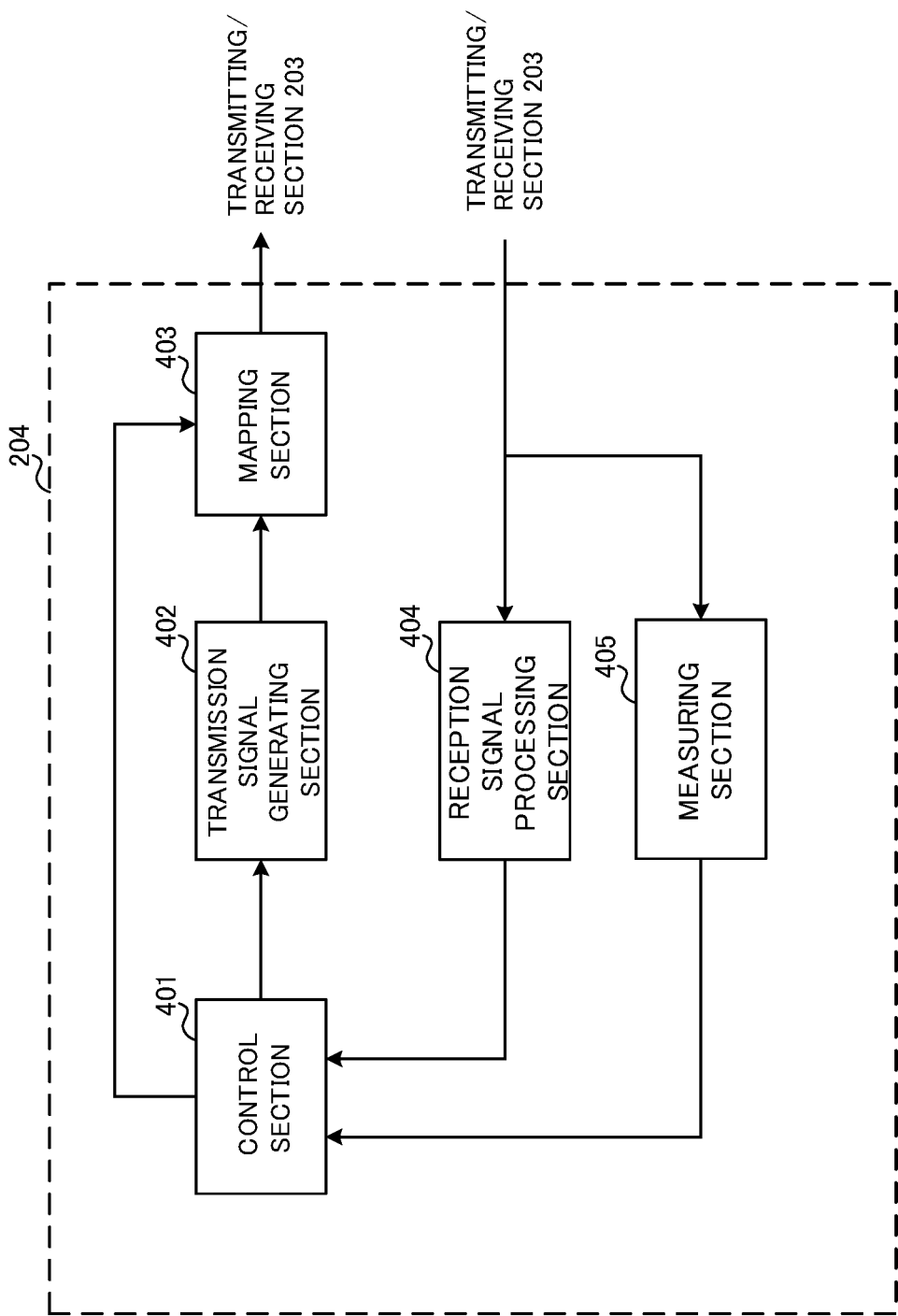
FIG. 17 is a diagram illustrating an example of a functional configuration of the user terminal according to the present embodiment.

FIG. 17 is a diagram illustrating the functional configuration of the user terminal according to the present embodiment. Note that FIG. 17 mainly shows functional blocks of the features of the present embodiment, and the user terminal 20 is also provided with other functional blocks that are necessary for carrying out radio communication. As illustrated in FIG. 17, the baseband signal processing section 204 provided in the user terminal 20 includes a control section 401, a transmission signal generating section 402, a mapping section 403, a reception signal processing section 404, and a determining section 405. The reception signal processing section 404 and the transmitting/receiving sections 203 may be combined to configure a reception section.

The control section 401 obtains, from the reception signal processing section 404, a downlink control signal (signal transmitted on PDCCH/EPDCCH) and a downlink data signal (signal transmitted on PDSCH) transmitted from the radio base station 10. The control section 401 controls generation of an uplink control signal (for example, a transmission acknowledgement signal (HARQ-ACK), etc.) and an uplink data signal based on a result of determination whether retransmission control for the downlink control signal and the downlink data signal is required or not. Specifically, the control section 401 may control the transmission signal generating section 402, the mapping section 403 and the reception signal processing section 404.

The control section 401 may be able to control reception of DL signals and transmission of UL signals for a plurality of communication systems and to control to avoid simultaneous transmission of UL signals for different communication systems (see FIG. 2).

In addition, when the transmitting/receiving section 203 transmits a UL signal in an FDD cell of the LTE system, the control section 401 may control transmission of the UL signal based on the first UL transmission timing that is applied to the UL/DL configuration defined in TDD of the LTE system (see FIGS. 6 and 8A). Otherwise, when the transmitting/receiving section 203 transmits a UL signal in an FDD cell of the LTE system, the control section 401 may be able to control transmission of the UL signal based on the second UL transmission timing that is applied to the FDD cell that is SCell in TDD-FDD CA where TDD is of PCesll (see FIGS. 7 and 8B).

Further, when the first UL transmission timing and the second transmission timing applies, the control section 401 is able to control to perform a decoding process on the assumption that the DCI format of a downlink control channel received in the FDD cell is a DCI format defined for TDD. Further, when the first UL transmission timing or the second transmission timing applies, the control section 401 is able to control the transmission timing of the UL signal based on a subframe offset configured to be specific to the user terminal (see FIGS. 10 and 11).

Further, the control section 401 may control to feed back a transmission acknowledgement signal for a DL signal, which is received in another communication system in a time interval in which UL transmission is performed in the LTE system, at a different timing from a transmission acknowledgement signal for a DL signal received in the other communication system in a time interval in which UL transmission is not performed in the LTE system (see FIG. 12). Note that the control section may be configured of a controller, a control circuit or a control device as explained in the technical field to which the present invention pertains.

The transmission signal generating section 402 generates a UL signal based on an instruction from the control section 401, and outputs the UL signal to the mapping section 403. For example, the transmission signal generating section 402 generates an uplink control signal such as a transmission acknowledgement signal (HARQ-ACK) or channel state information (CSI), etc. based on an instruction from the control section 401.

Further, the transmission signal generating section 402 generates an uplink data signal based on an instruction from the control section 401. For example, the transmission signal generating section 402 receives an instruction to generate an uplink data signal from the control section 401, when an UL grant is included in a downlink control signal provided from the radio base station. The transmission signal generating section 402 may be configured of a signal generator, a signal generating circuit or a signal generating device as explained based on the common knowledge in the technical field to which the present invention pertains.

The mapping section 403 maps the UL signal (uplink control signal and/or uplink data) generated by the transmission signal generating section 402, based on an instruction from the control section 401, to a radio resource and outputs the generated signal to the transmitting/receiving sections 203. The mapping section 403 may be configured of a mapper, a mapping circuit or a mapping device as explained based on the common knowledge in the technical field to which the present invention pertains.

The reception signal processing section 404 performs reception processing (e.g., demapping, demodulation, decoding, etc.) on the DL signal (including a downlink control signal transmitted from the radio base station, a downlink data signal transmitted on PDSCH from the radio base station). The reception signal processing section 404 outputs the information received from the radio base station 10 to the control section 401 and to the determining section 405. The reception signal processing section 404 outputs, for example, broadcast information, system information, RRC signaling, DCI, and so on to the control section 401. The reception signal processing section 404 may be configured of a signal processor, a signal processing circuit, a signal processing device, a measuring unit, a measuring circuit or a measuring device as explained based on the common knowledge in the technical field to which the present invention pertains. Further, the reception signal processing section 404 may constitute a reception section according to the present invention.

The determining section 405 performs a retransmission control determination (ACK/NACK) based on a decoding result of the reception signal processing section 404 and outputs the determination result to the control section 401. When downlink signals (PDSCH) are transmitted from a plurality of CCs (for example, six or more CCs), the determining section 405 performs retransmission control determination (ACK/NACK) for each of the CCs and outputs its result to the control section 401. The determining section 405 may be configured of a determining circuit or a determining device as explained based on the common knowledge in the technical field to which the present invention pertains.

Furthermore, the block diagrams used in the above description of the present embodiments indicate function-based blocks. These functional blocks (configured sections) are implemented via any combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio base station and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/ embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long as no contradictions occur. For example, each method described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. The present invention can be embodied in various modified or altered forms without departing from the sprit or scope of the present invention defined by claims. Accordingly, the description is given only for illustrative purposes and is by no means intended to limit the present invention.

The disclosure of Japanese Patent Application No. 2015-171450, filed on Aug. 31, 2015, including the specification, drawings, and abstract, is incorporated herein by reference in its entirety.

The invention claimed is:

1. A user terminal comprising:
a transmitter that, when dual connectivity using a first communication system and a second communication system is configured, transmits a transmission acknowledgement signal (HARQ-ACK: Hybrid Automatic Repeat reQuest-ACKnowledgement) for a cell to which Frequency Division Duplex (FDD) is applied; and
a processor that controls HARQ-ACK transmission for the cell to which the FDD is applied, by using a HARQ-ACK transmission procedure applied to Time Division Duplex (TDD)-FDD carrier aggregation in which the TDD is configured for a primary cell,
wherein the HARQ-ACK transmission for the cell to which the FDD is applied is transmitted on the cell to which the FDD is applied.

2. The user terminal according to claim 1, wherein the processor controls the HARQ-ACK transmission for the cell to which the FDD is applied, based on an uplink (UL)/downlink (DL) configured by higher layer signaling.

3. The user terminal according to claim 2, wherein a given format of downlink control information transmitted in the cell to which the FDD is applied includes a Downlink Assignment Index (DAI).

4. The user terminal according to claim 2, wherein a given format of downlink control information transmitted in the cell to which the FDD is applied includes an HARQ process number in 4 bits.

5. The user terminal according to claim 2, wherein the processor controls the HARQ-ACK transmission based on a given subframe offset.

6. The user terminal according to claim 1, wherein a given format of downlink control information transmitted in the cell to which the FDD is applied includes a Downlink Assignment Index (DAI).

7. The user terminal according to claim 6, wherein the processor controls the HARQ-ACK transmission based on a given subframe offset.

8. The user terminal according to claim 1, wherein a given format of downlink control information transmitted in the cell to which the FDD is applied includes an HARQ process number in 4 bits.

9. The user terminal according to claim 8, wherein the processor controls the HARQ-ACK transmission based on a given subframe offset.

10. The user terminal according to claim 1, wherein the processor controls the HARQ-ACK transmission based on a given subframe offset.

11. The user terminal according to claim 10, wherein when the given subframe offset is configured by higher layer signaling, the processor applies the subframe offset to a subframe number in a UL/DL configuration.

12. A radio base station comprising:
a receiver that receives, from a user terminal connecting to a plurality of different communication systems by using dual connectivity, a transmission acknowledgement signal (HARQ-ACK: Hybrid Automatic Repeat reQuest-ACKnowledgement) for a cell to which Frequency Division Duplex (FDD) is applied in a given communication system; and
a processor that controls reception of the HARQ-ACK based on a HARQ-ACK transmission procedure applied to Time Division Duplex (TDD)-FDD carrier aggregation in which the TDD is configured for a primary cell,
wherein the HARQ-ACK transmission for the cell to which the FDD is applied is received on the cell to which the FDD is applied.

13. A radio communication method for a user terminal comprising:
when dual connectivity using a first communication system and a second communication system is configured, transmitting a transmission acknowledgement signal (HARQ-ACK: Hybrid Automatic Repeat reQuest-ACKnowledgement) for a cell to which Frequency Division Duplex (FDD) is applied; and
controlling HARQ-ACK transmission for the cell to which the FDD is applied, by using a HARQ-ACK transmission procedure applied to Time Division Duplex (TDD)-FDD carrier aggregation in which the TDD is configured for a primary cell,
wherein the HARQ-ACK transmission for the cell to which the FDD is applied is transmitted on the cell to which the FDD is applied.

* * * * *